United States Patent
Bilstad

(10) Patent No.: US 10,660,060 B1
(45) Date of Patent: May 19, 2020

(54) SYSTEMS AND METHODS FOR PRECISE RADIO FREQUENCY LOCALIZATION OF A WIRELESS ARBITRARY DEVICE

(71) Applicant: Locix, Inc., San Bruno, CA (US)

(72) Inventor: Arnold Mark Bilstad, Los Altos, CA (US)

(73) Assignee: Locix, Inc., San Bruno, CA (US)

( * ) Notice: Subject to any disclaimer, the term of this patent is extended or adjusted under 35 U.S.C. 154(b) by 0 days.

(21) Appl. No.: 16/260,608

(22) Filed: Jan. 29, 2019

(51) Int. Cl.
*H04W 64/00* (2009.01)
*H04W 4/02* (2018.01)
*G01S 5/14* (2006.01)
*H04L 12/26* (2006.01)
*H04W 4/029* (2018.01)

(52) U.S. Cl.
CPC .......... *H04W 64/003* (2013.01); *G01S 5/145* (2013.01); *H04L 43/106* (2013.01); *H04W 4/025* (2013.01); *H04W 4/029* (2018.02)

(58) Field of Classification Search
CPC ... H04W 64/003; H04W 4/025; H04W 4/029; G01S 5/145; H04L 43/106
See application file for complete search history.

(56) References Cited

U.S. PATENT DOCUMENTS

| | | | |
|---|---|---|---|
| 2008/0039119 A1* | 2/2008 | Crawford | G01S 5/021 455/456.1 |
| 2018/0249410 A1* | 8/2018 | Amini | H04L 1/0041 |
| 2019/0014592 A1* | 1/2019 | Hampel | H04W 72/1278 |
| 2019/0206231 A1* | 7/2019 | Armstrong | G06N 5/025 |

* cited by examiner

*Primary Examiner* — Wayne H Cai
(74) *Attorney, Agent, or Firm* — Jaffery Watson Mendonsa & Hamilton LLP

(57) ABSTRACT

Systems and apparatuses for determining location of a wireless arbitrary device are disclosed herein. In one example, an asynchronous system for localization of a wireless arbitrary device in a wireless network architecture includes a plurality of wireless anchor nodes each having a wireless device with one or more processing units and RF circuitry for transmitting and receiving communications in the wireless network architecture. The one or more processing units of at least one wireless anchor node are configured to receive instructions to prepare for localization of the wireless arbitrary device, to change a RF channel to be the same as an RF channel of the wireless arbitrary device based on the received instructions, to receive a communication including data traffic from the wireless arbitrary device, and to obtain ranging information including a receive timestamp and channel sense information (CSI) from the data traffic.

26 Claims, 18 Drawing Sheets

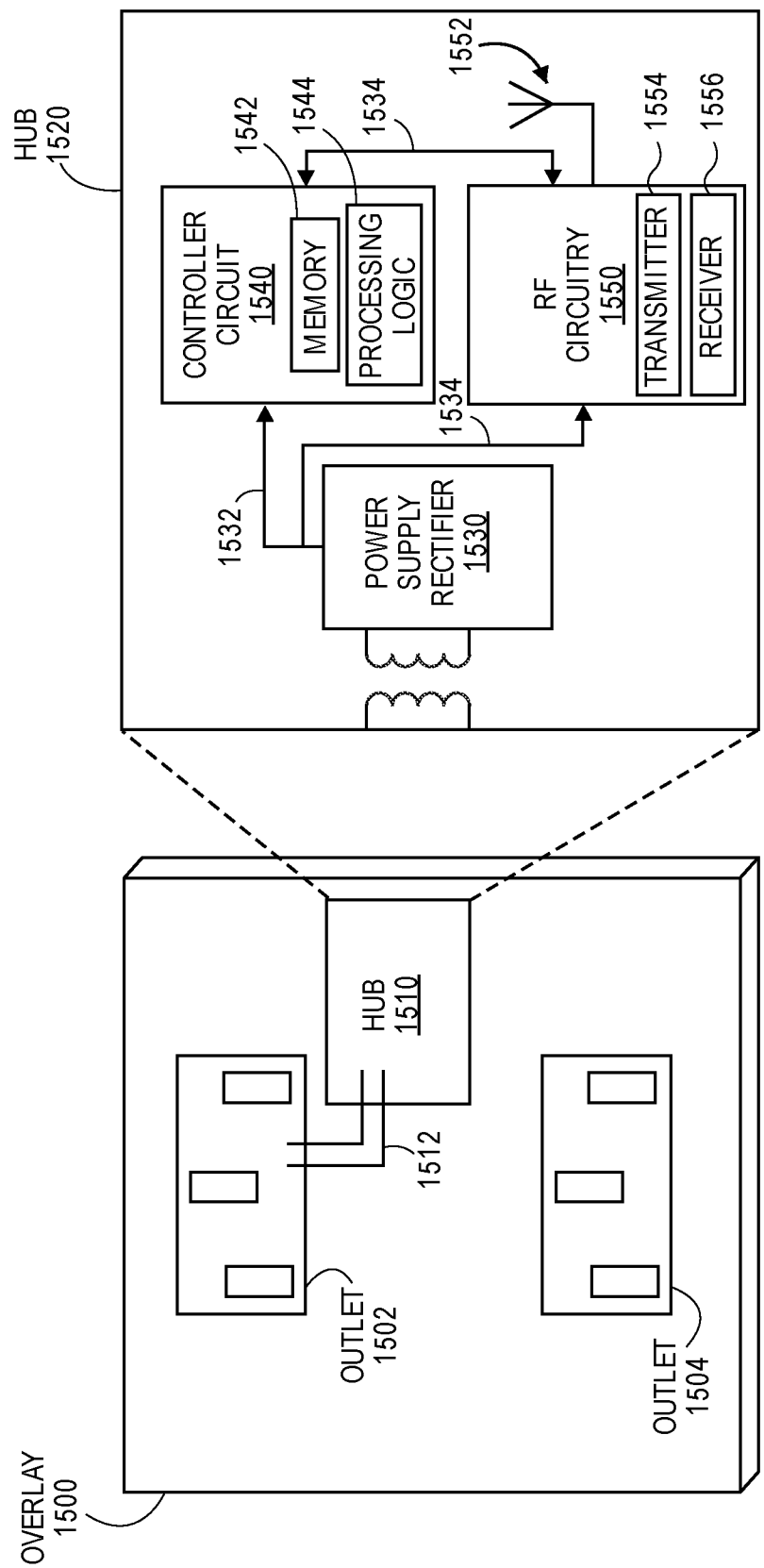

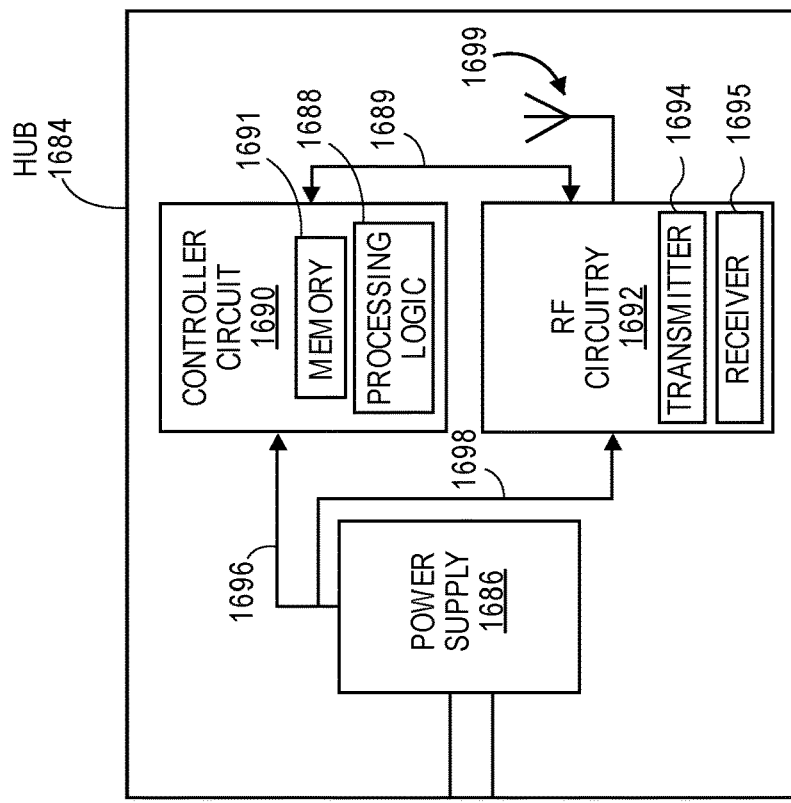
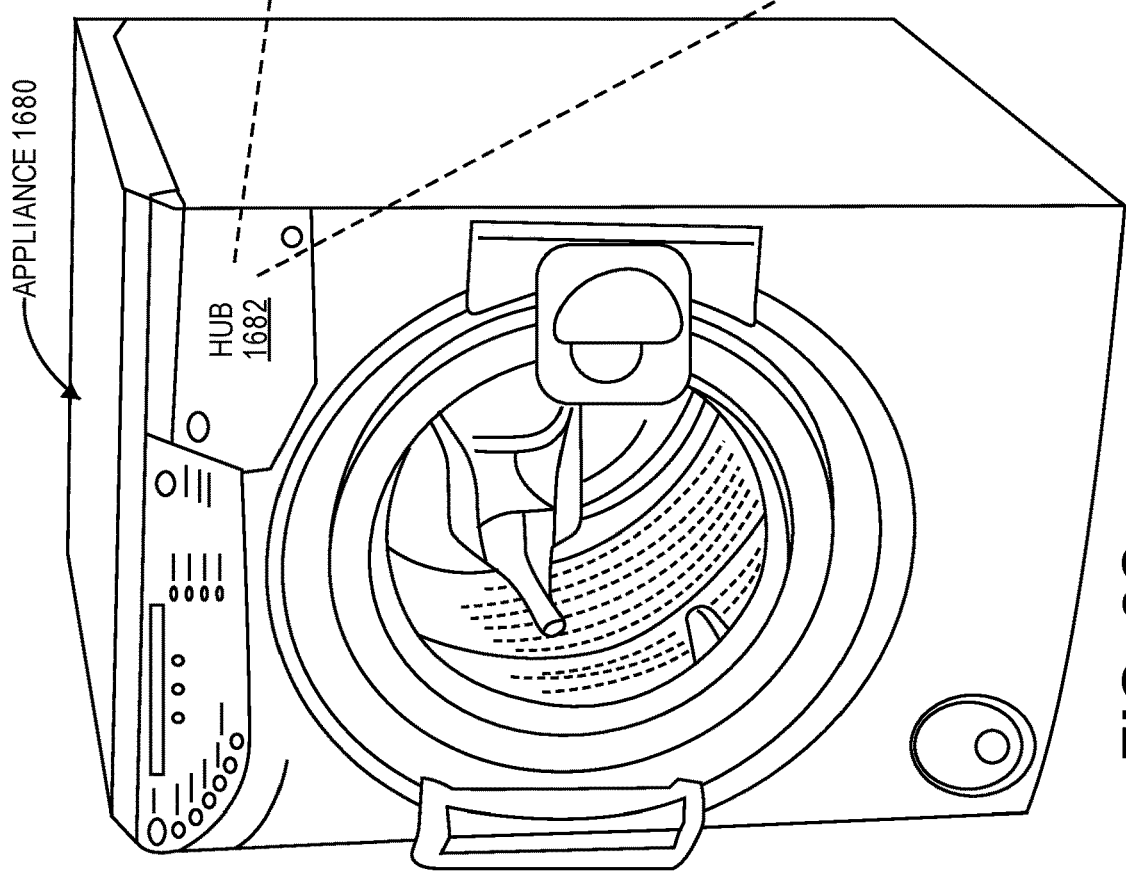
FIG. 8D
FIG. 8C

SYSTEMS AND METHODS FOR PRECISE RADIO FREQUENCY LOCALIZATION OF A WIRELESS ARBITRARY DEVICE

FIELD

Embodiments of the invention pertain to systems and methods for precise radio frequency localization of a wireless arbitrary device using time difference of arrival information.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Location detection of nodes in indoor wireless networks is useful and important in many applications.

Localization based on time difference of arrival (TDoA) technique for multilateration is performed using radio frequency measurements for determining location of wirelessly equipped objects in three dimensional space. RF-based localization may be performed in numerous ways. An exemplary implementation includes a hub and multiple sensor nodes. Note that the hub may be replaced with a node, or indeed, one or more of the nodes may be replaced with a hub. Distances are estimated using radio frequency techniques between all the individual pairs via RF communications. In TDoA, one node transmits a signal. Multiple other nodes receive the signal, and the time difference between reception at each receive node is calculated. TDoA requires synchronization of the receivers to accurately measure the difference in receive times. This can be done by operating all of the receivers on a shared clock and comparing absolute timestamps. In systems where a shared clock is not available, the receivers must be synchronized in another way.

SUMMARY

For one embodiment of the present invention, systems and apparatuses for determining location of a wireless arbitrary device in a wireless network architecture are disclosed herein. In one example, an asynchronous system for localization of a wireless arbitrary device in a wireless network architecture includes a plurality of wireless anchor nodes each having a wireless device with one or more processing units and RF circuitry for transmitting and receiving communications in the wireless network architecture. The one or more processing units of at least one wireless anchor node are configured to receive instructions to prepare for localization of the wireless arbitrary device, to change a RF channel to be the same as an RF channel of the wireless arbitrary device based on the received instructions, to receive a communication including data traffic from the wireless arbitrary device, and to obtain ranging information including a receive timestamp and channel sense information (CSI) from the data traffic.

In another embodiment, a computer implemented method for localization of a wireless arbitrary device in a wireless network architecture includes initializing a wireless network architecture having a plurality of wireless anchor nodes and a plurality of wireless sensor nodes, preparing, with the plurality of wireless anchor nodes, for localization of the wireless arbitrary device, changing a RF channel of the plurality of wireless anchor nodes to be the same as a RF channel of the wireless arbitrary device, receiving, with the plurality of wireless anchor nodes, a communication including data traffic from the wireless arbitrary device, and obtaining, with the plurality of wireless anchor nodes, ranging information including a receive timestamp and channel sense information (CSI) from the received data traffic.

In another embodiment, a computer implemented method for localization of a wireless arbitrary device in a wireless network architecture, comprises initializing a wireless network architecture having a plurality of wireless anchor nodes and a plurality of wireless sensor nodes, preparing, with the plurality of wireless anchor nodes, for localization of the wireless arbitrary device, waiting, with at least one anchor node, to receive a packet from the wireless arbitrary device, receiving, with the at least one anchor node, a communication including a packet from the wireless arbitrary device, and transmitting, with the at least one anchor node, a communication including a synchronization packet to other anchor nodes of the plurality of wireless anchor nodes.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 7A shows an exemplary embodiment of a hub implemented as an overlay 1500 for an electrical power outlet in accordance with one embodiment.

FIG. 7B shows an exemplary embodiment of an exploded view of a block diagram of a hub implemented as an overlay for an electrical power outlet in accordance with one embodiment.

FIG. 8C shows an exemplary embodiment of a hub implemented within an appliance (e.g., smart washing machine, smart refrigerator, smart thermostat, other smart appliances, etc.) in accordance with one embodiment.

FIG. 8D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1A:
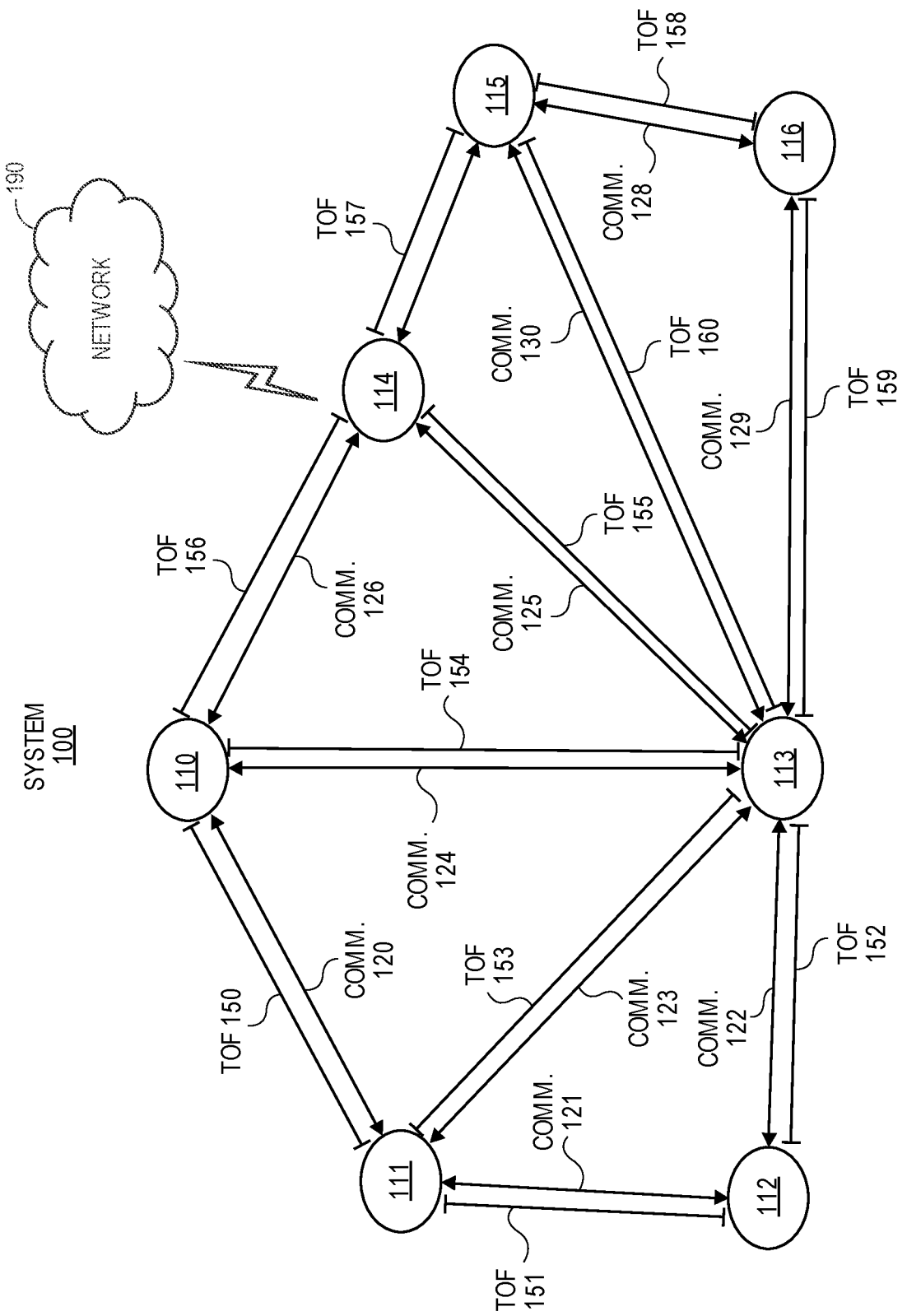
FIG. 1A shows an exemplar system of wireless nodes in accordance with one embodiment.

Systems and methods for precise radio frequency localization of arbitrary devices are disclosed herein. In one example, an arbitrary device is tracked or located with a wireless sensor network that includes wireless nodes (e.g., hubs, sensors nodes, anchor nodes having known locations, access points). The arbitrary device may have no association with the wireless sensor network and only have an association with an access point. Wireless nodes have an ability to capture receive timestamp communications and CSI of frames of the arbitrary device. A localization cloud service or cloud network entity has a compute capability and connectivity to anchor nodes and arbitrary devices (e.g., arbitrary wireless local area network devices, arbitrary wireless WiFi devices).

In one example, the one or more processing units of a wireless node or localization cloud service are configured to execute instructions for a multilateration algorithm to determine a location of an arbitrary wireless device having an unknown and mobile location using the time difference of arrival information.

In various applications of wireless sensor networks, it may be desirable to determine the location of sensor nodes and arbitrary wireless devices within the network. For example, such information may be used to estimate the relative position of sensors such as security cameras, motion sensors, temperature sensors, and other such sensors as would be apparent to one of skill in the art. This information may then be used to produce augmented information such as maps of temperature, motion paths, and multi-view image captures. Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

Embodiments of the invention provide systems, apparatuses, and methods for localization detection in indoor environments. U.S. patent application Ser. No. 14/830,668 filed on Aug. 19, 2015, which is incorporated by reference herein, discloses techniques for RF-based localization. Specifically, the systems, apparatuses, and methods implement localization in a wireless sensor network that primarily uses a tree network structure for communication with periodic mesh-based features for path length estimation when localization is needed. The wireless sensor network has improved accuracy of localization while simultaneously providing good quality of indoor communication by using high-frequencies for localization and lower frequencies for communication.

Tree-like wireless sensor networks are attractive for many applications due to their reduced power requirements associated with the radio signal reception functionality. An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607, 048 filed on Jan. 29, 2015, and U.S. patent application Ser. No. 14/607,050 filed on Jan. 29, 2015, which are incorporated by reference in entirety herein.

Another type of wireless network that is often used is a mesh network. In this network, communication occurs between one or more neighbors, and information may then be passed along the network using a multi-hop architecture. This may be used to reduce transmit power requirements, since information is sent over shorter distances. On the other hand, receive radio power requirements may increase, since it is necessary for the receive radios to be on frequently to enable the multi-hop communication scheme.

FIG. 1A illustrates an exemplar system of wireless nodes in accordance with one embodiment. This exemplar system 100 includes wireless nodes 110-116. The nodes communicate bi-directionally with communications 120-130 (e.g., node identification information, sensor data, node status information, synchronization information, localization information, other such information for the wireless sensor network, time of flight (TOF) communications, etc.). Based on using time of flight measurements, path lengths between individual pairs of nodes can be estimated. An individual time of flight measurement between nodes 110 and 111 for example, can be achieved by sending a signal at a known time from node 110 to node 111. Node 111 receives the signal, records a time stamp of reception of the signal of the communications 120, and can then, for example, send a return signal back to A, with a time stamp of transmission of the return signal. Node 110 receives the signal and records a time stamp of reception. Based on these two transmit and receive time stamps, an average time of flight between nodes 110 and 111 can be estimated based on computations of at least one of the nodes or based on computations of a cloud network entity 190. This process can be repeated multiple times and at multiple frequencies to improve precision and to eliminate or reduce degradation due to poor channel quality at a specific frequency. A set of path lengths can be estimated by repeating this process for various node pairs. For example, in FIG. 1, the path lengths are TOF 150-160. Then, by using a geometric model, the relative position of individual nodes can be estimated based on a triangulation-like process.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication and only time of flights between the nodes and the hub are measured periodically. Provided these time of flights are held relatively constant, the network then assumes nodes have not moved and does not waste energy is attempting to re-run mesh-based localization. On the other hand, when a change in path length in the tree network is detected, the network switches to a mesh-based system and re-triangulates to determine location of each node in the network.

In another example, a multilateration algorithm is performed to determine a location of a wireless arbitrary device having an unknown location using time difference of arrival information for a plurality of nodes.

Figure 1B:
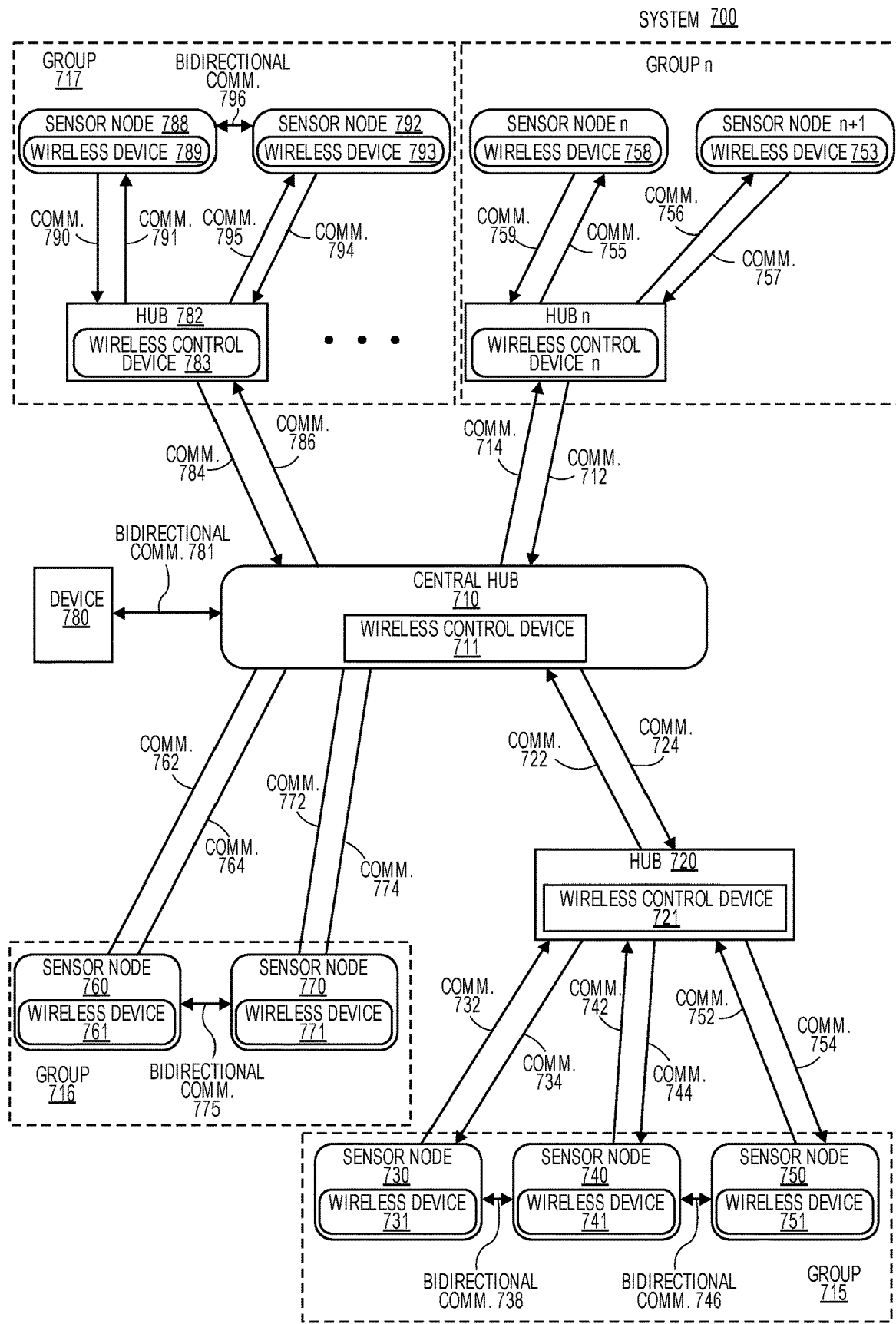
FIG. 1B shows an exemplar system of wireless nodes having multiple hubs for communicating in accordance with one embodiment.

FIG. 1B shows an exemplar system of wireless nodes having multiple hubs for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including an arbitrary device 780 (e.g., client device, mobile device, tablet device, computing device, smart appliance, smart TV, etc.) having an unknown location. The arbitrary device 780 may only be associated with an access point (e.g., hub 710) or an access point that is separate from the hub 710.

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

By using the architecture illustrated in FIG. 1B, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

To determine the distance between two objects based on RF, ranging measurements are performed (i.e., RF communication is used to estimate the distance between the pair of objects). To achieve this, an RF signal is sent from one device to another. FIGS. 3-8C of U.S. patent application Ser. No. 15/173,531 illustrate embodiments of time of flight measurement systems.

Figure 2A:
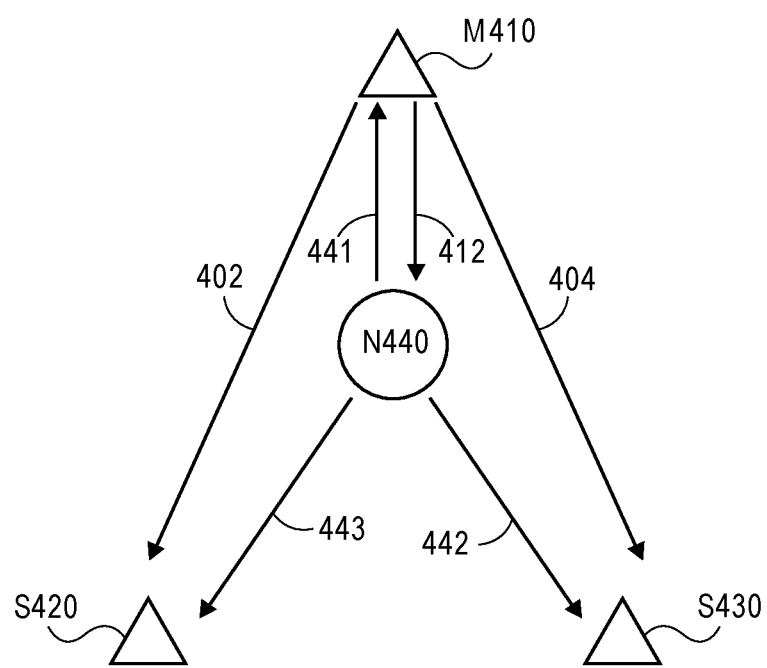
FIG. 2A illustrates a system for localization of nodes utilizing time difference of arrival in accordance with one embodiment.
Figure 2B:
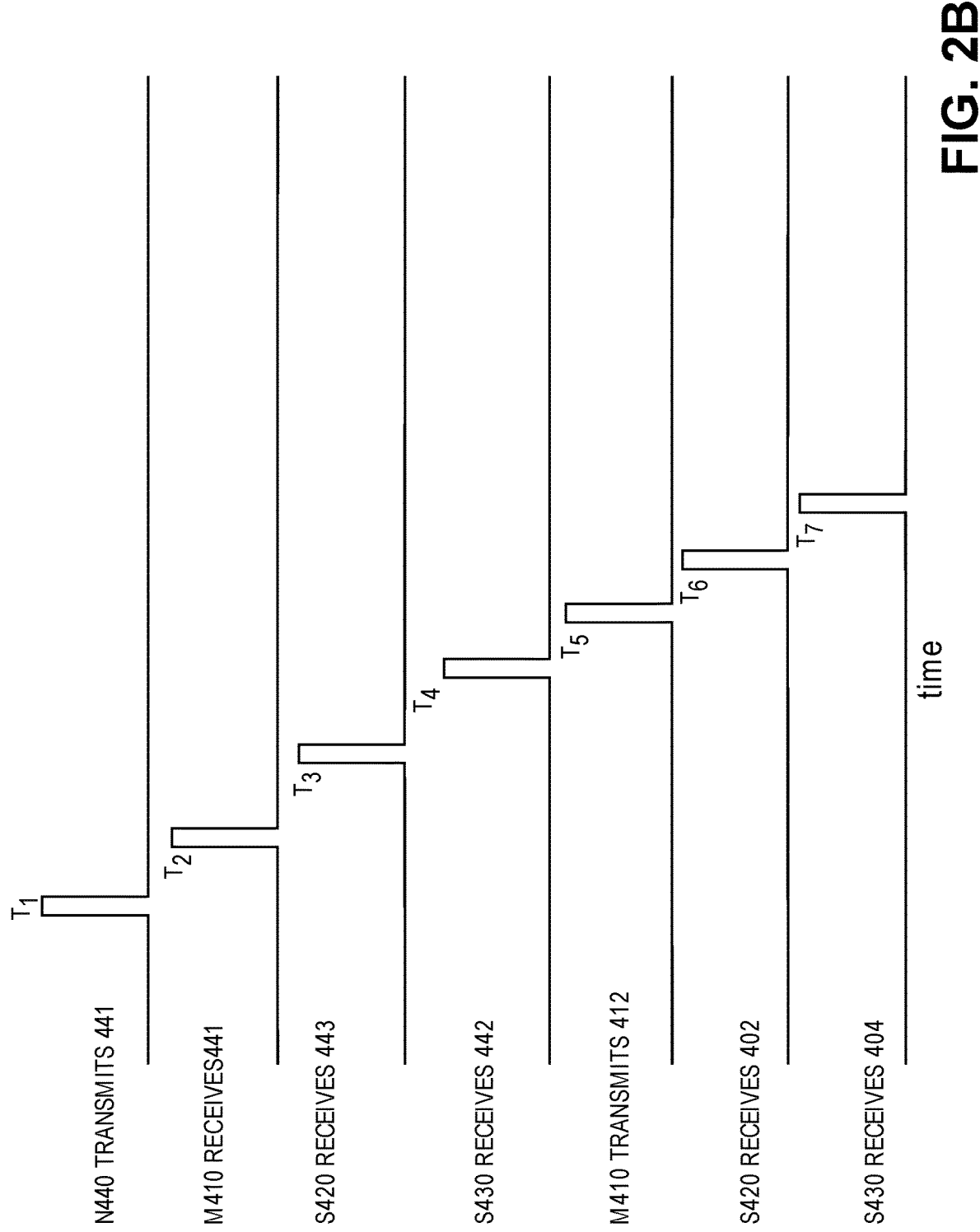
FIG. 2B illustrates a timing diagram 352 for localization of a wireless arbitrary device in accordance with one embodiment.

FIG. 2A illustrates a system for localization of nodes utilizing time difference of arrival in accordance with one embodiment. The system 400 is configured to have one master node 410 (M410) integrated with an access point, one wireless arbitrary device 440 at unknown location (N440), and sniff nodes (e.g., S420, S430, etc.). FIG. 2B illustrates a timing diagram for communications of the system 400 in accordance with one embodiment. The wireless arbitrary device N440 initiates the packet transaction during a non-sleep or non-low power state. The device N440 may typically be in a sleep state or low power state. N440 sends a communication 441 (e.g., forward packet 441) to the master (M) node 410 at time $T_1$. The master node 410 receives the communication 441 at time $T_2$. The master node 410 responds with a communication 412 (e.g., an acknowledgement packet 412) at time $T_5$. The sniff nodes 420 and 430 listen to the communications 442-443 at times $T_4$ and $T_3$ (e.g., forward packets 442-443) from N440 and the communications 402 and 404 (e.g., acknowledgement packet 402 and 404) from the master node 410. The sniff node 420 receives the communication 443 at time $T_3$ and receives the communication 402 at time $T_6$. The sniff node 430 receives the communication 442 at time $T_4$ and receives the communication 404 at time $T_7$. The received packets 441-443 originate from the same communication from N440.

The TDoA is now calculated based on the arrival of the forward packets at the master and sniff nodes from N440. The packet transmission time of the acknowledgement packets from the master node is now used to align the timing between the nodes in accordance with Equation 1 with delta offset equaling $T_6 - T_5 - T_{oF\ M410-S420}$:

$$T_{DoA\ M410-S420} = T_2 - T_3^{M410}$$
$$= T_2 - T_3 - \text{delta offset between clocks of } M410 \text{ and } S420$$
$$= (T_2 - T_3) + T_6 - T_5 - T_{oF\ M410-S420}$$
$$= (T_{2\,sampling} + T_{2\,frac} - T_{3\,sampling} - T_{3\,frac}) + T_{6\,sampling} +$$
$$T_{6\,frac} - T_{5\,sampling} - T_{5\,frac} - T_{oF\ M410-S420}$$

Figure 3:
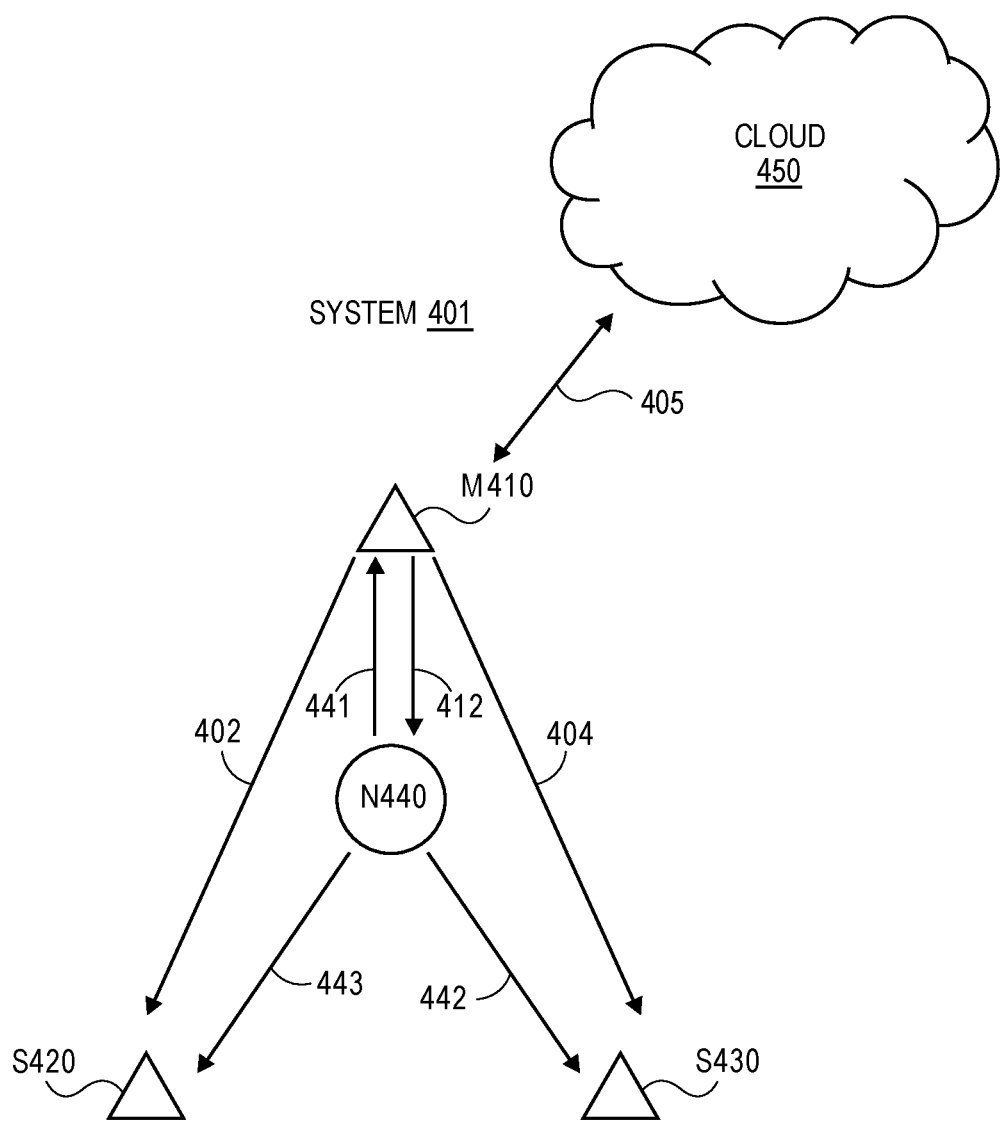
FIG. 3 illustrates a cloud based system for localization of nodes utilizing time difference of arrival in accordance with another embodiment.

FIG. 3 illustrates a cloud based system for localization of nodes utilizing time difference of arrival in accordance with another embodiment. The system 401 is configured to have a cloud network entity 450, one master node 410 (M410) integrated with an access point, one wireless arbitrary device 440 at unknown location (N440), and sniff nodes (e.g., S420, S430, etc.). TDoA is performed for system 401 in a similar manner as described above for system 400, except with the system 401 additionally having bi-directional communications 445 between AP 411 and the cloud network entity 450. TDoA calculations can be performed with the master node or the cloud network entity 450.

In one embodiment for localization of an arbitrary wireless device that is only associated with an access point (not associated with a master node nor other wireless nodes), no changes are needed for a wireless communication protocol stack (e.g., WiFi protocol stack) on the arbitrary wireless device. Rather, the arbitrary device only has application level changes. Prior to a localization or tracking App being installed, the arbitrary device has no association with components of the wireless network including hubs and sensor nodes.

An anchor function of an anchor node may or may not be integrated into the same device as the WiFi AP function of an access point. In one example, a wireless communication module of the arbitrary device spends most of its time sleeping to conserve power. Therefore, the arbitrary wireless device is preferably the initiator of frame exchanges.

The arbitrary wireless device will utilize encryption with its AP. Therefore, anchor nodes of the wireless network will not be able to decode payload of the arbitrary wireless device transmissions. However, the anchor nodes can obtain CSI of the transmissions.

The arbitrary wireless device may or may not have 802.11ac (80 mhz) support, may or may not have an inertial sensor (e.g., accelerometer, gyroscope), may or may not have 802.11mc FTM support, and may or may not have WiFi CSI collection capability. The present design is capable of triggering the arbitrary wireless device to transmit on demand (or at known time) such that numerous anchor nodes can simultaneously receive the transmissions from the arbitrary wireless device. The present design influences the arbitrary wireless device to transmit at a highest available bandwidth of an access point and can obtain high ranging accuracy using CSI due to this highest available bandwidth.

For initial set-up of the tracking of the arbitrary wireless device, a user installs a localization or tracking App on the arbitrary wireless device. The user or another person installs anchor nodes in a localization space or environment (e.g., building). The user or another person installs APs for regular wireless coverage (e.g., WiFi coverage) in the localization space.

Figure 4A:
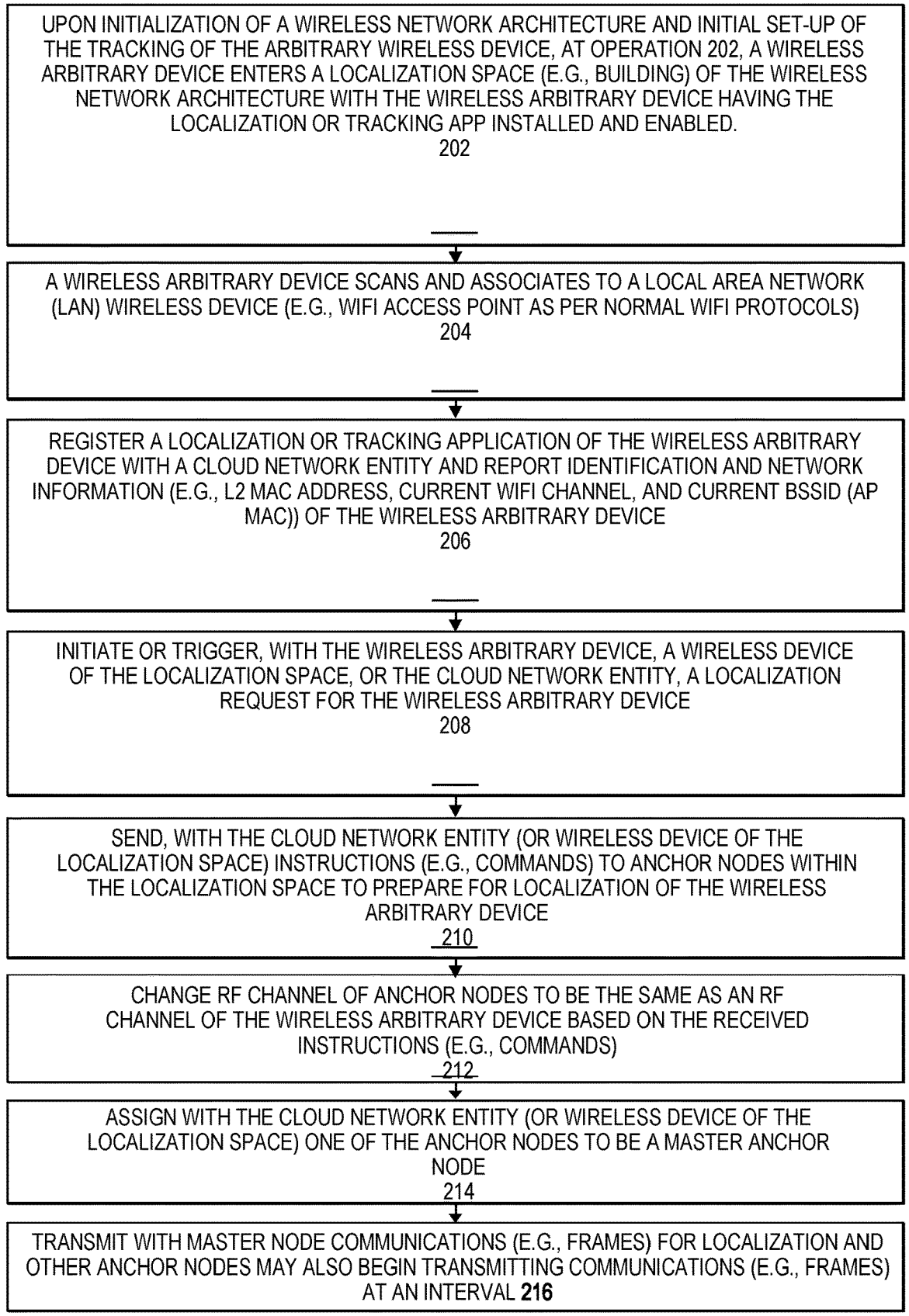
FIGS. 4A and 4B illustrate a method for determining a location estimation of an arbitrary wireless device having an unknown location in accordance with one embodiment.
Figure 4B:
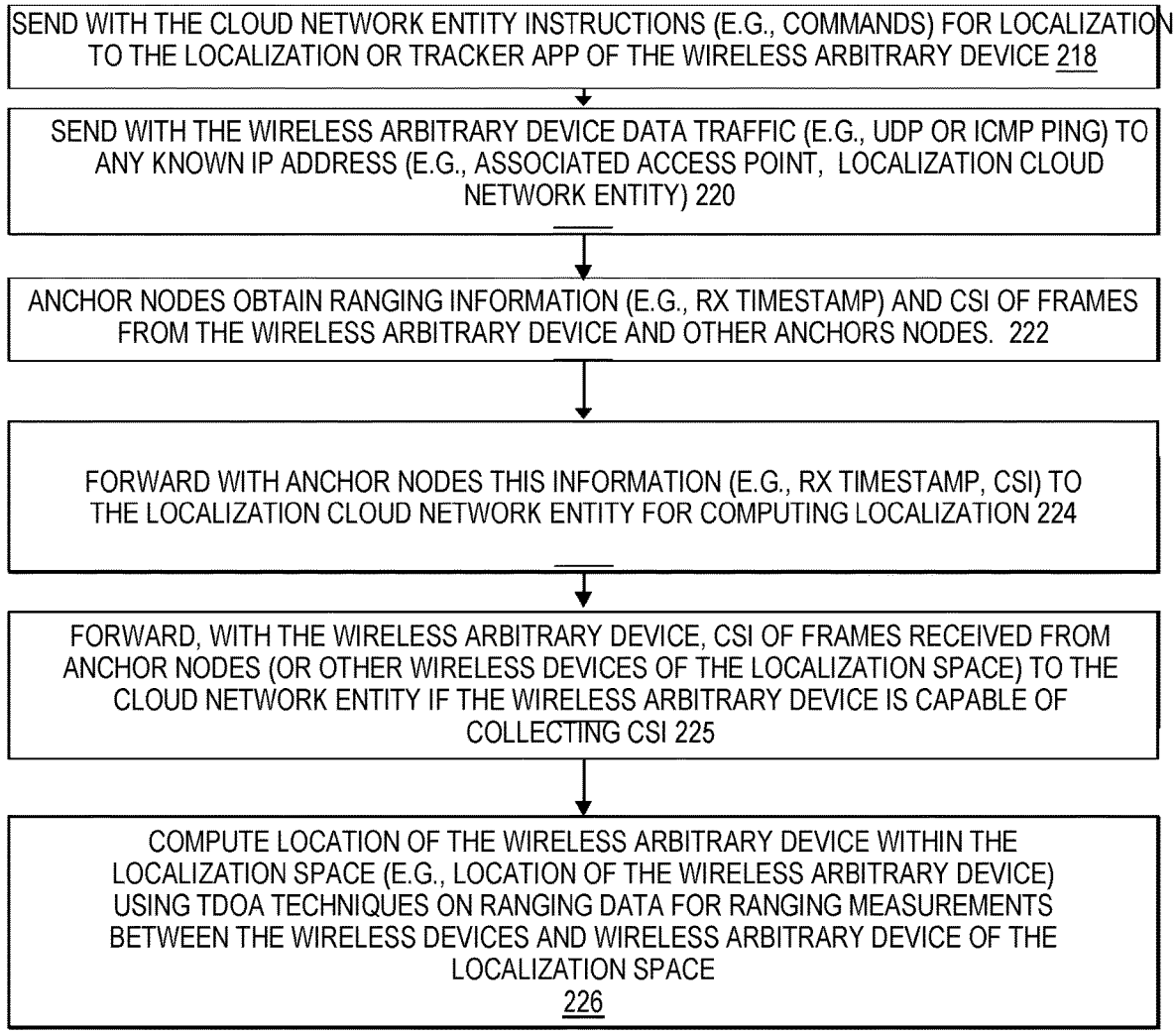

FIGS. 4A and 4B illustrate a method for determining a location estimation of an arbitrary wireless device having an unknown location in accordance with one embodiment. The operations of method 200 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one wireless device within a localization space and a cloud network entity perform the operations of method 200.

Upon initialization of a wireless network architecture and initial set-up of the tracking of the arbitrary wireless device, at operation 202, a wireless arbitrary device enters a localization space (e.g., building) of the wireless network architecture with the wireless arbitrary device having the localization or tracking app installed and enabled. At operation 204, a wireless arbitrary device scans and associates to a local area network (LAN) wireless device (e.g., WiFi access point as per normal WiFi protocols). After association at operation 204, a localization or tracking Application of the wireless arbitrary device registers with a cloud network entity and reports identification and network information (e.g., L2 MAC address, current WiFi channel, and current BSSID (AP MAC)) of the wireless arbitrary device at operation 206.

At operation 208, the wireless arbitrary device, a wireless device of the localization space, or the cloud network entity initiates or triggers a localization request for the wireless arbitrary device. In one example, the localization request is initialized or triggered On demand from a cloud user of the cloud network entity. In another example, the localization request is initialized or triggered On demand from a user of the wireless arbitrary device. In another example, the localization request is Timer-based from the cloud network entity or timer-based from the wireless arbitrary device. In another example, the localization request is initialized or triggered on a motion basis (e.g., accelerometer, gyroscope) from the arbitrary wireless device.

The wireless arbitrary device can be located once when becoming stationary and then tracked or monitored continuously while the wireless arbitrary device moves. Alternatively, the wireless arbitrary device can be located once when changing an access point association (proxy for motion).

At operation 210, the cloud network entity (or wireless device of the localization space) sends instructions (e.g., commands) to anchor nodes within the localization space to prepare for localization of the wireless arbitrary device. In one example, the anchor nodes are within close proximity of the access point that is associated with the wireless arbitrary device. The anchor nodes can be within a same constellation grouping of the access point or be adjacent to the constellation grouping of the access point.

At operation 212, the anchor nodes change their RF channel to be the same as an RF channel of the wireless arbitrary device based on the received instructions (e.g., commands). At operation 214, the cloud network entity (or wireless device of the localization space) assigns one of the anchor nodes to be a master anchor node. At operation 216, the master node begins transmitting communications (e.g., frames) for localization and other anchor nodes may also begin transmitting communications (e.g., frames) at an interval. At operation 218, the cloud network entity sends instructions (e.g., commands) for localization to the localization or tracker App of the wireless arbitrary device.

At operation 220, the wireless arbitrary device sends data traffic (e.g., UDP or ICMP ping) to any known IP address (e.g., associated access point, localization cloud network entity). In one example, for an 802.11 layer, WiFi, this traffic will include at least one of Unicast frames directed at the L2 MAC address of the associated access point, and data frames which are likely encrypted and sent at the highest physical rate supported by the associated access point. The access point will acknowledge many of these frames from the wireless arbitrary device.

At operation 222, the anchor nodes obtain ranging information (e.g., RX timestamp) and channel sense information (CSI) of headers of frames from the wireless arbitrary device and other anchors nodes. At operation 224, anchor nodes forward this information (e.g., RX timestamp, CSI) to the localization cloud network entity for computing localization. In one example, frames of the wireless arbitrary device cannot be decrypted or decoded, so payload will be discarded.

At operation 225, if the wireless arbitrary device is capable of collecting CSI, then the wireless arbitrary device will forward CSI of frames received from anchor nodes (or other wireless devices of the localization space) to the cloud network entity.

At operation 226, the cloud network entity (or wireless device) computes location of the wireless arbitrary device within the localization space (e.g., location of the wireless arbitrary device) using TDoA techniques on ranging data for ranging measurements between the wireless devices and wireless arbitrary device of the localization space. These techniques are specified in U.S. application Ser. No. 15/684,893, which is incorporated by reference herein. In one example, the master anchor is acknowledging frames transmitted by the wireless arbitrary device during the TDoA technique. A localization request may be repeated for continuous tracking of the wireless arbitrary device.

Figure 5A:
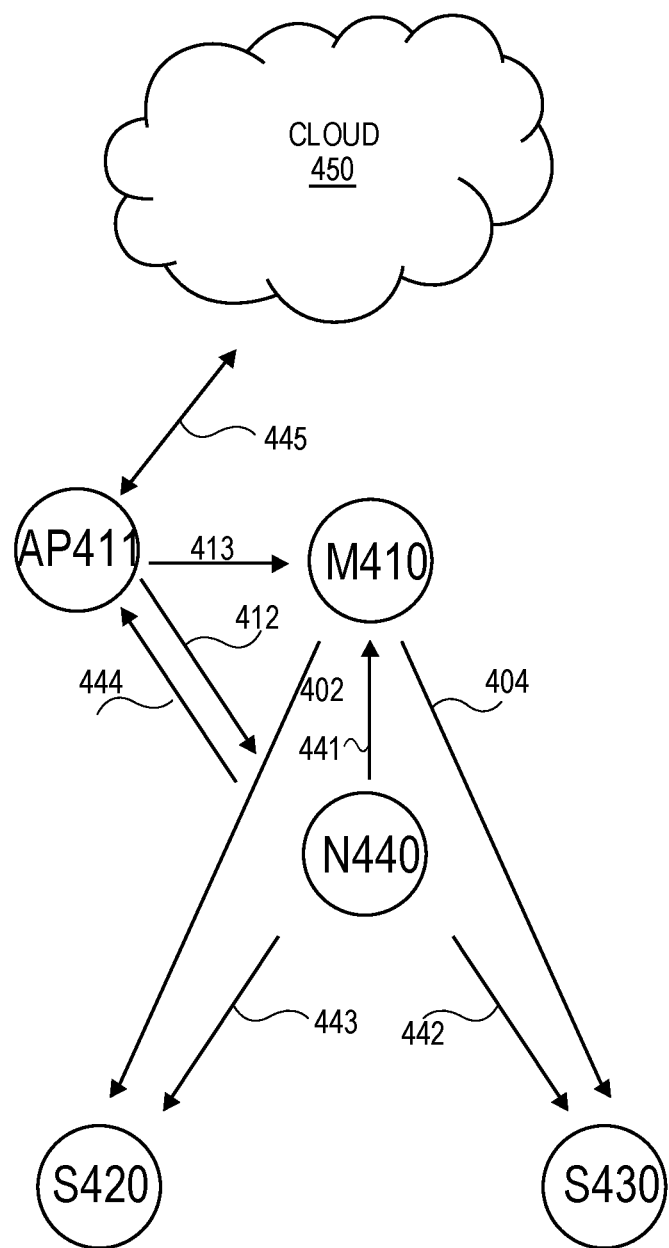
FIG. 5A illustrates a system 500 for localization of an arbitrary device utilizing time difference of arrival in accordance with one embodiment.

FIG. 5A illustrates a system for localization of nodes utilizing time difference of arrival in accordance with one embodiment. The system 500 is configured to have one master node 410 (M410), one wireless arbitrary device 440 at an unknown location (N440), access point 411, and anchor nodes 420, 430 (e.g., sniff nodes 420, 430). The master node 410 may initially perform two way time of flight with RTT and fractional distance (as described in the U.S. patent application Ser. No. 15/173,531) to each of the sniff nodes. The nodes, arbitrary device, and access point may transmit and receive bi-directional communications between each other. The arbitrary device 440 is associated with the access point 411. The system of FIG. 5 is designed to have the master node 410 transmit a transmission at approximately the same time or within a predefined time period of a forward packet of transmission 444 being transmitted from the device 440 to the access point 411. The nodes 410, 420, and 430 may receive the forward packet of a corresponding transmission 441, 442, and 443 even though these nodes are not intended recipients of the forward packet. The AP 411 sends an acknowledgement 412, which is directed to N440 (communication path 412), but reaches several anchors (e.g., communication path 413). M410 using various methods (e.g., reactive, predictive, hybrid, etc) to transmit a packet with communications 402, 404 in a nearby timeframe to transmission 444, and this transmission reaches several anchors (communication paths 402 and 404). The packet transmitted by M410 may be directed to another device, or it may simply be broadcast.

Figure 5B:
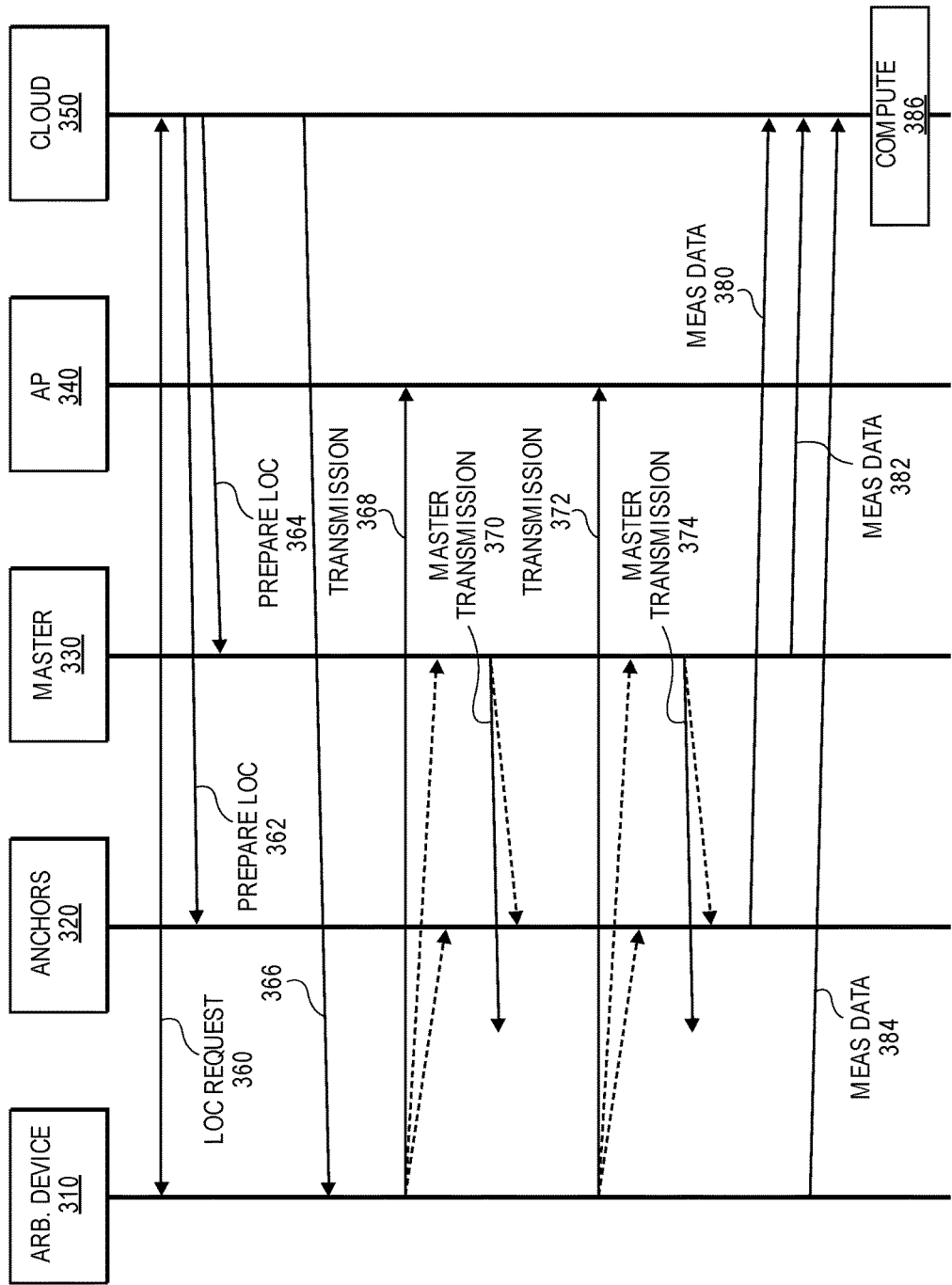
FIG. 5B illustrates a timing diagram for communications of the system 500 in accordance with one embodiment.

FIG. 5B illustrates a timing diagram 550 for localization of a wireless arbitrary device in accordance with one embodiment. Upon initialization of a wireless network architecture and initial set-up of the tracking of the wireless arbitrary device, a wireless arbitrary device scans and associates to a local area network (LAN) wireless device (e.g., WiFi access point as per normal WiFi protocols). The wireless arbitrary device (e.g., user's device, mobile device, tablet device, etc.) will not be associated with wireless nodes of the wireless network architecture in general because wireless arbitrary device will only be associated with the access point 340. At operation 360, a localization or tracking application of the wireless arbitrary device 310 registers with a cloud network entity 350 and reports identification and network information (e.g., L2 MAC address, current WiFi channel, and current BSSID (AP MAC)) of the wireless arbitrary device. The wireless arbitrary device may also initiate or trigger a localization request for the wireless arbitrary device at operation 360.

At operation 362, the cloud network entity 350 (or wireless device of the localization space) sends instructions (e.g., commands) to anchor nodes 320 within the localization space of the wireless network to prepare for localization of the wireless arbitrary device 310. In one example, the anchor nodes are within close proximity of the access point 340 that is associated with the wireless arbitrary device. The anchor nodes can be within a same constellation grouping of the access point or nearby to the constellation grouping of the access point.

The anchor nodes 320 change their RF channel to be the same as an RF channel of the wireless arbitrary device based on the received instructions (e.g., commands). At operation 364, the cloud network entity (or wireless device of the localization space) sends instructions to assign one of the anchor nodes to be a master anchor node 330 and to prepare for localization based on ranging measurements. At operation 366, the cloud network entity sends instructions (e.g., commands) to the localization or tracker application of the wireless arbitrary device to prepare for localization.

At operation 368, the wireless arbitrary device sends communications including data traffic (e.g., UDP or ICMP ping) to any known IP address (e.g., associated access point, localization cloud network entity). In one example, for an 802.11 layer, WiFi, this traffic will include at least one of Unicast frames directed at the L2 MAC address of the associated access point, and data frames which are likely encrypted and sent at the highest physical rate supported by the associated access point. The access point will acknowledge many of these frames from the wireless arbitrary device. The master and anchor nodes may also receive the transmission 368.

At operation 370, the master node 330 transmits communications (e.g., frames) for localization to the anchor nodes and the wireless arbitrary device. Other anchor nodes may also begin transmitting frames at an interval.

At operation 372, the wireless arbitrary device 310 transmits communications for localization (e.g., frames) to the access point 340. The anchor nodes 320 and master node 330 also receive these communications from the wireless arbitrary device 310.

At operation 374, the master node 330 transmits communications (e.g., frames) for localization to the anchor nodes and the wireless arbitrary device. The operations 368, 370, 372, and 374 perform ranging measurements for localization of the wireless arbitrary device.

At operation 380, the anchor nodes transmit communications with ranging measurements to the cloud network entity. The anchor nodes receive wireless communications and obtain ranging information (e.g., RX timestamp, CSI) of frames of the wireless communications from the wireless arbitrary device and other anchors nodes. The anchor nodes forward this ranging information (e.g., RX timestamp, CSI) to the localization cloud network entity. In one example, frames of the wireless arbitrary device cannot be decrypted, so payload will be discarded. At operation 382, the master node transmits communications with ranging measurements to the cloud network entity. The master node receives wireless communications and obtains ranging information (e.g., RX timestamp, CSI) of frames of the wireless communications from the wireless arbitrary device and other anchors nodes. Also, the master node provides egress timestamps for transmitted communications to the cloud network entity.

At operation 384, if the wireless arbitrary device is capable of collecting CSI, then the wireless arbitrary device will forward ranging measurements and CSI of frames received from anchor nodes (or other wireless devices of the localization space) to the cloud network entity 350.

At operation 386, the cloud network entity computes location of the wireless arbitrary device within the localization space (e.g., location of the wireless arbitrary device) using TDoA techniques based on ranging data of ranging measurements between the wireless nodes and wireless arbitrary device of the localization space. The TDoA technique utilizes data packets from the wireless arbitrary device instead of acknowledgements packets to improve accuracy of the localization due to data packets receiving a wider frequency bandwidth (e.g., 80 MHz) in comparison to acknowledgement packets for wireless LANs. This localization of the present design is more accurate than using Fine Time Measurement (FTM) protocol that requires FTM hardware for WiFi devices.

As disclosed in U.S. application Ser. No. 15/684,893, time of flight measurements for ranging are inherently sensitive to the timing of operations within the network, and therefore, the clocking of the devices performing the measurements is important. In one embodiment, an arbitrary device (e.g., mobile device, non-stationary device) at an unknown location can be located via TDoA without a shared clock. The receive nodes are synchronized using an additional transaction between the known nodes. Note that the locations of the known nodes can be determined using localization as described in the U.S. patent application Ser. No. 15/173,531.

Figure 6A:
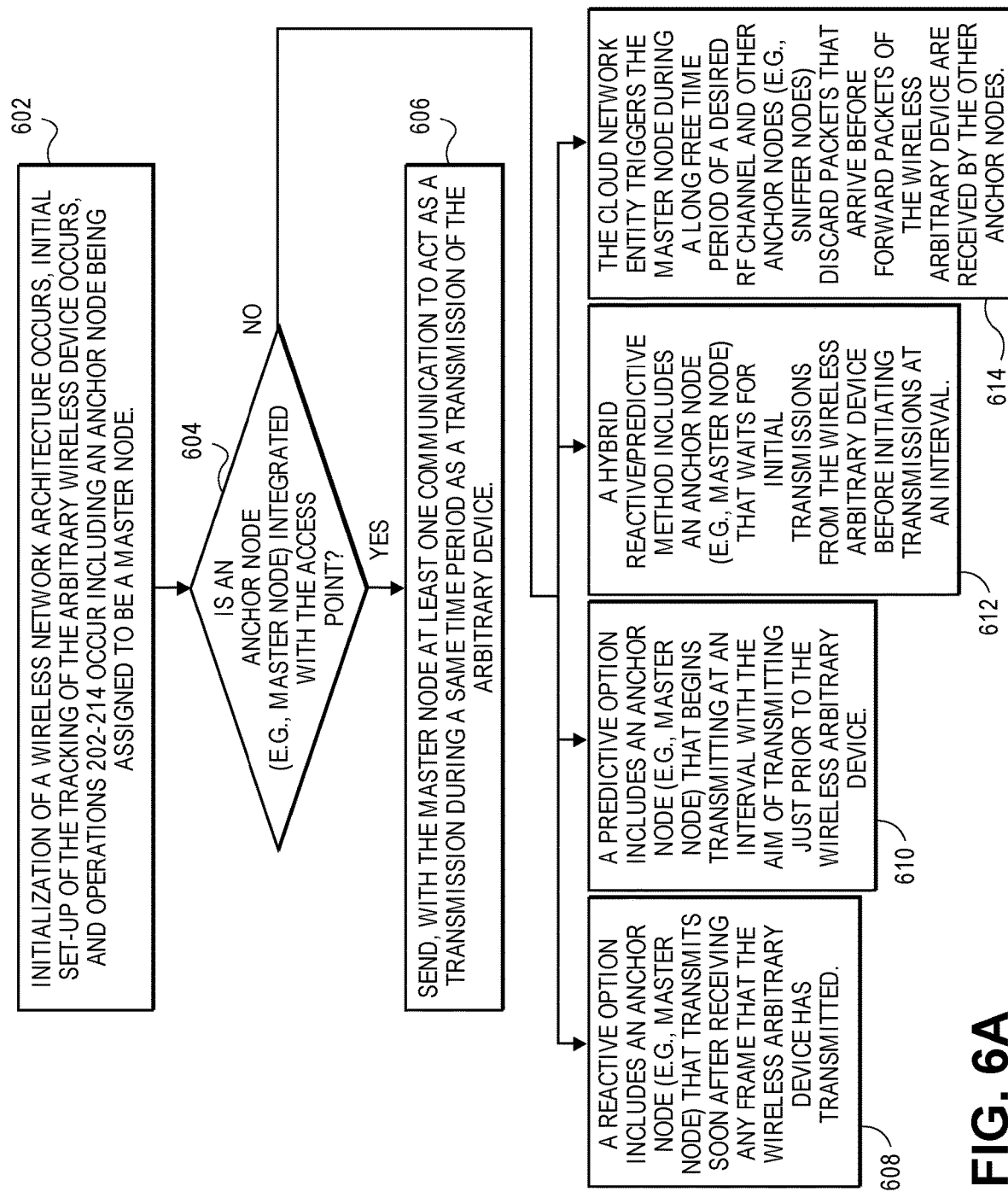
FIG. 6A illustrates a method for scheduling a transmission of an anchor node within a same time period as a transmission of a wireless arbitrary device in accordance with one embodiment.

FIG. 6A illustrates a method for scheduling a transmission of an anchor node within a same time period as a transmission of a wireless arbitrary device in accordance with one embodiment. The operations of method 600 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one wireless device within a localization space and a cloud network entity perform the operations of method 600.

The present design provides for transmissions of anchor nodes within a same time period (e.g., within several 100 microseconds) as a transmission of the wireless arbitrary device in order to maintain an unchanged RF channel for localization. It is desired to have master nodes and anchor nodes (sniffer nodes) synchronized with respect to each other and this synchronization can be triggered with respect to receiving a forward packet (initial communication from arbitrary device) during TDoA technique. The transmission of the anchor node may simply be broadcast or may be directed to a WiFi device. The wireless arbitrary device and anchor transmissions may be asynchronous with different clocking signals.

At operation 602, initialization of a wireless network architecture occurs, initial set-up of the tracking of the arbitrary wireless device occurs, and operations 202-214 occur including an anchor node being assigned to be a master node. The cloud network entity or a wireless device determines whether an anchor node (e.g., master node) is integrated with the access point that is associated with the wireless arbitrary device at operation 604. This determination for operation 604 may also occur prior to completing operations 202-214 or during operations 202-214.

In one example, if an anchor node (e.g., master node) is integrated with the access point, then at operation 606 the master node sends at least one communication with at least one acknowledgement to the arbitrary device and this at least one acknowledgement acts as a transmission during a same time period as a transmission of the arbitrary device.

Alternatively, if an anchor node is not integrated with the access point, then different implementations occur. In a second example at operation 608, a reactive option includes an anchor node (e.g., master node) that transmits soon after receiving any frame that the wireless arbitrary device has transmitted.

In a third example at operation 610, a predictive option includes an anchor node (e.g., master node) that begins transmitting at an interval with the aim of transmitting just prior to the wireless arbitrary device. Any frame may be used, but one such option is the IEEE 802.11 Clear-to-send (CTS) frame which is designed with a short duration and has the ability to grant airtime to the wireless arbitrary device.

In a fourth example at operation 612, a hybrid reactive/predictive method includes an anchor node (e.g., master node) that waits for initial transmissions from the wireless arbitrary device before initiating transmissions at an interval.

In a fifth example at operation 614, the cloud network entity triggers the master node during a long free time period of a desired RF channel and other anchor nodes (e.g., sniffer nodes) discard packets that arrive before forward packets of the wireless arbitrary device are received by the other anchor nodes.

Figure 6B:
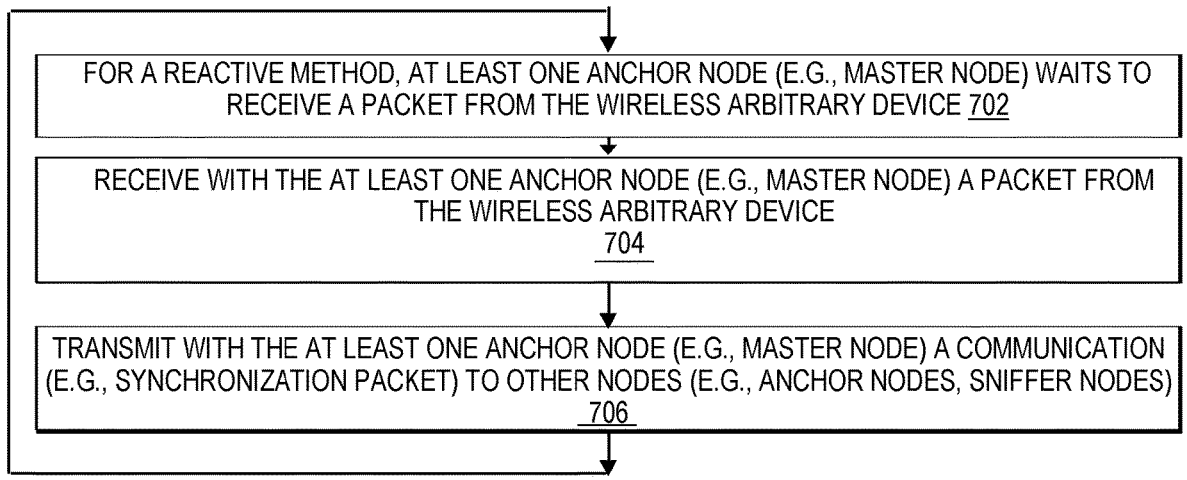
FIG. 6B illustrates a reactive method for scheduling a transmission of an anchor node within a same time period as a transmission of a wireless arbitrary device in accordance with one embodiment.

FIG. 6B illustrates a reactive method for scheduling a transmission of an anchor node within a same time period as a transmission of a wireless arbitrary device in accordance with one embodiment. The operations of method 700 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one wireless device within a localization space and a cloud network entity perform the operations of method 700. The operations of method 700 represent sub-operations of operation 608 of FIG. 6A.

At operation 702, at least one anchor node (e.g., master node) waits to receive a packet from the wireless arbitrary device. At operation 704, the at least one anchor node (e.g., master node) receives a packet from the wireless arbitrary device. At operation 706, the at least one anchor node (e.g., master node) transmits a communication (e.g., synchronization packet) to other nodes (e.g., anchor nodes, sniffer nodes).

Figure 6C:
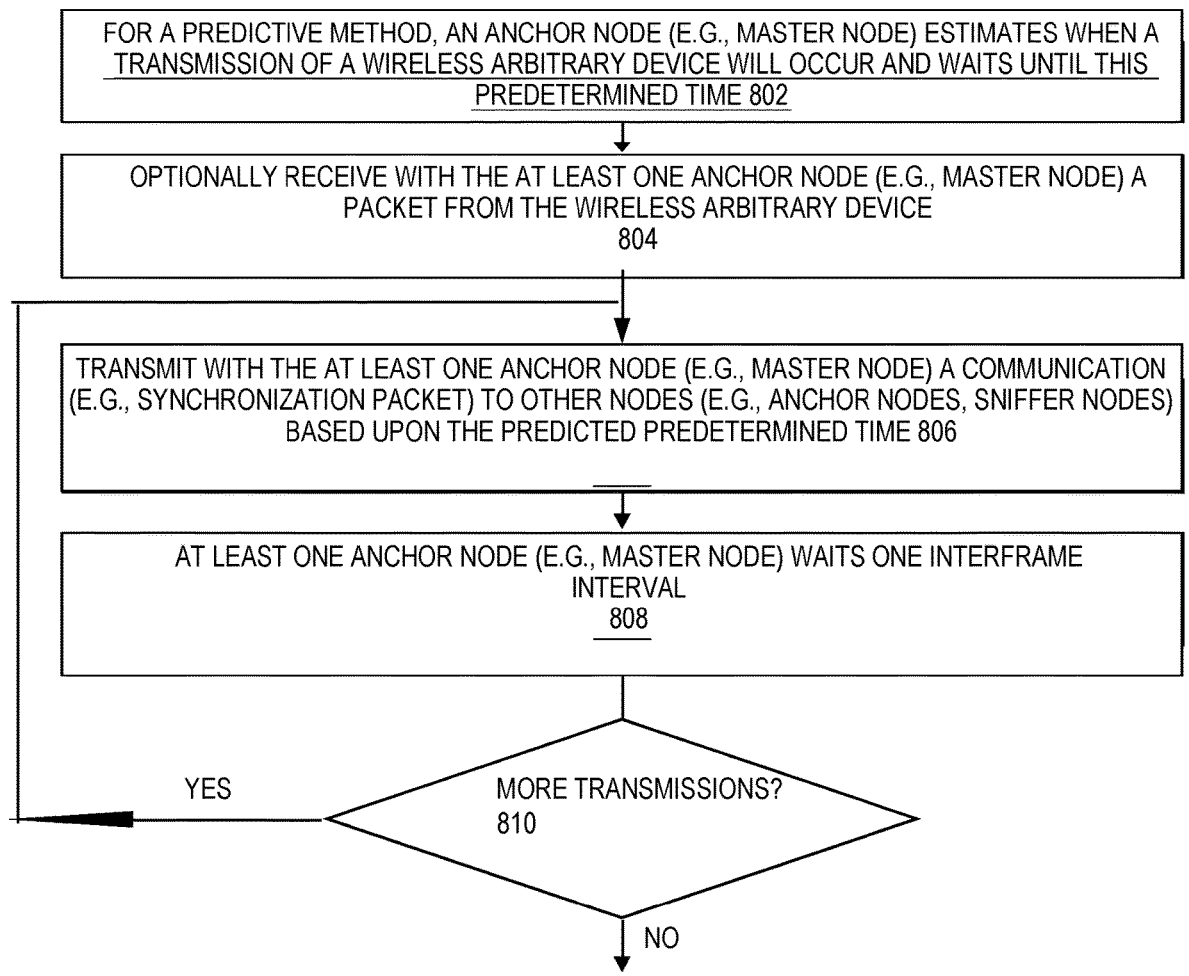
FIG. 6C illustrates a predictive method for scheduling a transmission of an anchor node within a same time period as a transmission of a wireless arbitrary device in accordance with one embodiment.

FIG. 6C illustrates a predictive method for scheduling a transmission of an anchor node within a same time period as a transmission of a wireless arbitrary device in accordance with one embodiment. The operations of method 800 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one wireless device within a localization space and a cloud network entity perform the operations of method 800. The operations of method 800 represent sub-operations of operation 610 of FIG. 6A.

In one example, an app of the wireless arbitrary device is requested to transmit at a predetermined time in the future, for a predetermined number of repetitions, with a predetermined interframe gap between transmissions and because most 802.11 frames must contend for the channel using a random back-off, there is typically tens of microseconds of uncertainty of when the transmission will actually occur. At operation 802, at least one anchor node (e.g., master node) estimates when a transmission of a wireless arbitrary device will occur and waits until this predetermined time. At operation 804, the at least one anchor node (e.g., master node) may optionally receive a packet from the wireless arbitrary device. At operation 806, the at least one anchor node (e.g., master node) transmits a communication (e.g., synchronization packet) to other nodes (e.g., anchor nodes, sniffer nodes). At operation 808, the at least one anchor node (e.g., master node) waits one interframe interval. At operation 810, the at least one anchor node determines whether any more transmissions from the wireless arbitrary device are predicted. If so, the method 800 returns to operation 806. Otherwise, the method terminates.

Figure 6D:
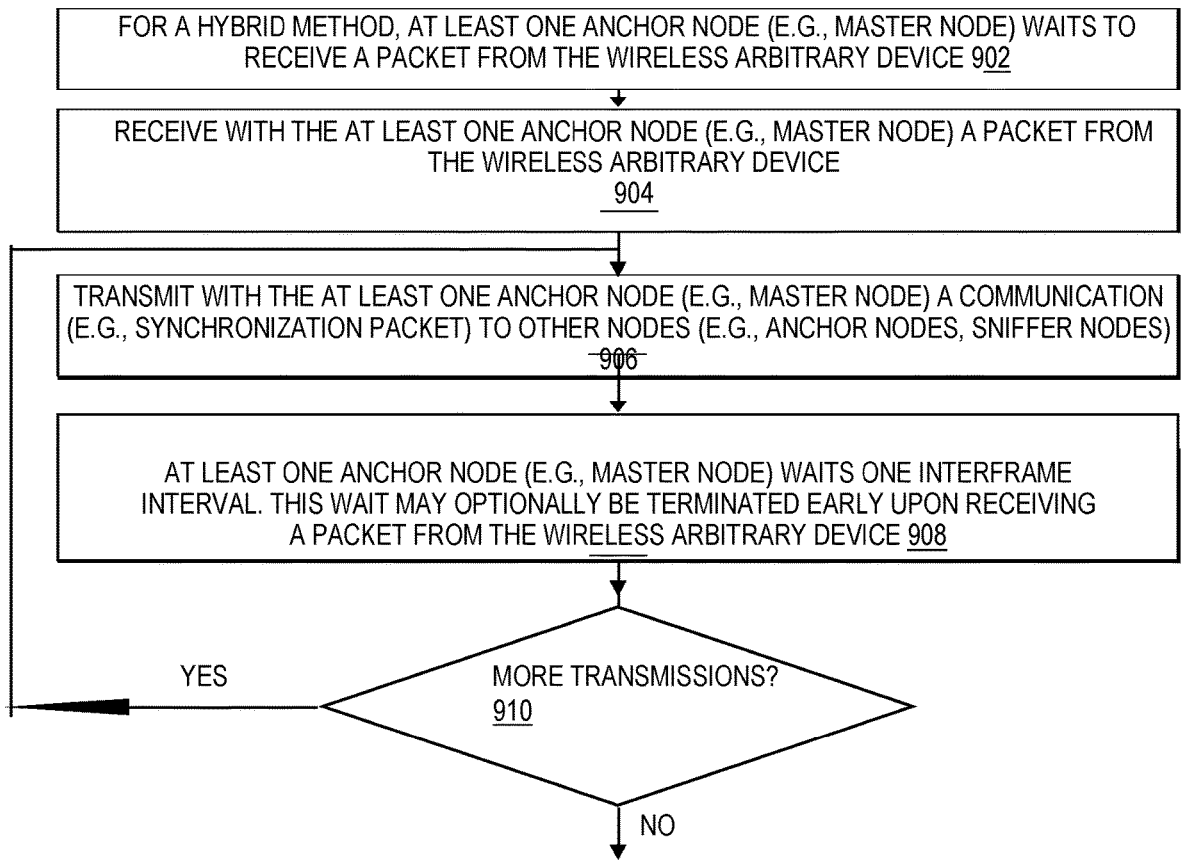
FIG. 6D illustrates a hybrid method for scheduling a transmission of an anchor node within a same time period as a transmission of a wireless arbitrary device in accordance with one embodiment.

FIG. 6D illustrates a hybrid method for scheduling a transmission of an anchor node within a same time period as a transmission of a wireless arbitrary device in accordance with one embodiment. The operations of method 900 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one wireless device within a localization space and a cloud network entity perform the operations of method 900. The operations of method 900 represent sub-operations of operation 612 of FIG. 6A.

In one example, an app of the wireless arbitrary device is requested to transmit at a predetermined time in the future, for a predetermined number of repetitions, with a predetermined interframe gap between transmissions and because most 802.11 frames must contend for the channel using a random back-off, there is typically tens of microseconds of uncertainty of when the transmission will actually occur. At operation 902, at least one anchor node (e.g., master node) waits to receive a packet from a wireless arbitrary device. A precise predetermined time is not necessary. At operation 904, the at least one anchor node (e.g., master node) receives a packet from the wireless arbitrary device. At operation 906, the at least one anchor node (e.g., master node) transmits a communication (e.g., synchronization packet) to other nodes (e.g., anchor nodes, sniffer nodes). At operation 908, the at least one anchor node (e.g., master node) waits one interframe interval. This wait may optionally be terminated early upon receiving a packet from the wireless arbitrary device. At operation 910, the at least one anchor node determines whether any more transmissions from the wireless arbitrary device are predicted. If so, the method 900 returns to operation 906. Otherwise, the method terminates.

There are several options for the format of the "synchronization" packet as described herein. If the master is also the AP, then the synchronization packet may be an 802.11 Acknowledgement (or Block-Ack). This has the advantage that APs already send this as part of normal protocol operation, and it is sent contention-free.

The synchronization packet may be an 802.11 Clear-to-send frame directed to the wireless arbitrary device. This has the advantage that it will clear the channel (suppress transmission of other 802.11 stations) for a specified width (e.g. 80 MHz) such that the wireless arbitrary device can transmit contention-free.

If the master is also the AP and both AP and Node support polling (802.11 HCCA), then the synchronization packet may be a poll which has the advantage that it will clear the channel (suppress transmission of other 802.11 stations) for a specified width (e.g., 80 MHz) such that the wireless arbitrary device can transmit contention-free.

The synchronization packet may be any other 802.11 OFDM frame. Any combination of the above can be used.

Although the wireless arbitrary device can only be associated to a single AP, there is no restriction on the number of masters, i.e. multiple anchors may transmit synchronization frames during the measurement. In every topology described herein, there may be one or more masters.

The communication between hubs, nodes, and wireless arbitrary devices as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs (e.g., a master node, an anchor node) may be implemented in a variety of ways including narrow-band, channel overlapping, channel stepping, multi-channel wide band, and ultra-wide band communications.

The hubs may be physically implemented in numerous ways in accordance with embodiments of the invention. FIG. 7A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 7B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 8B:
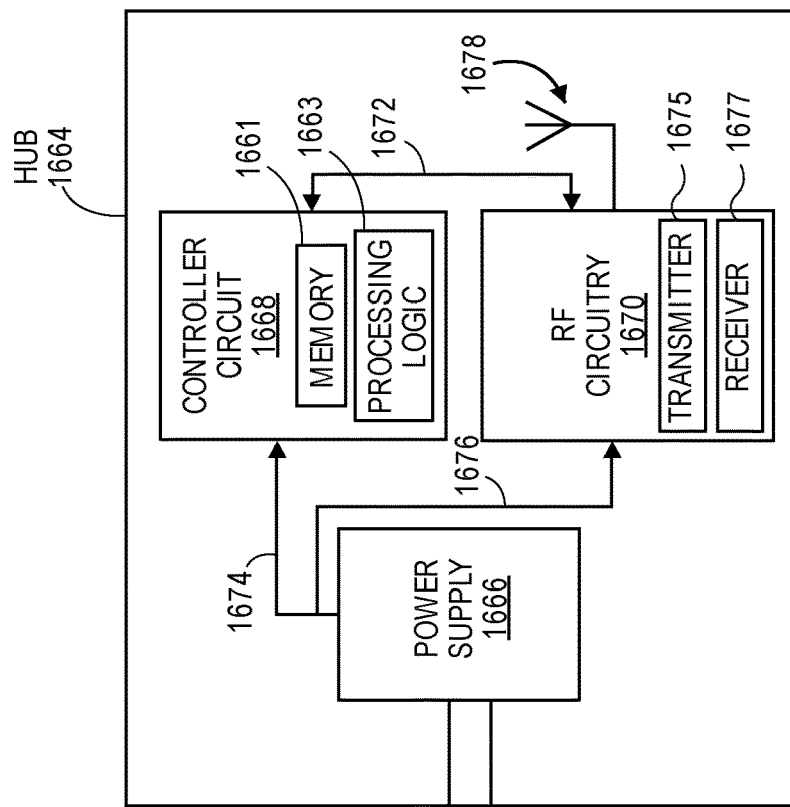
FIG. 8B shows an exemplary embodiment of a block diagram of a hub 964 implemented as a card for deployment in a computer system, appliance, or communication hub in accordance with one embodiment.
Figure 8A:
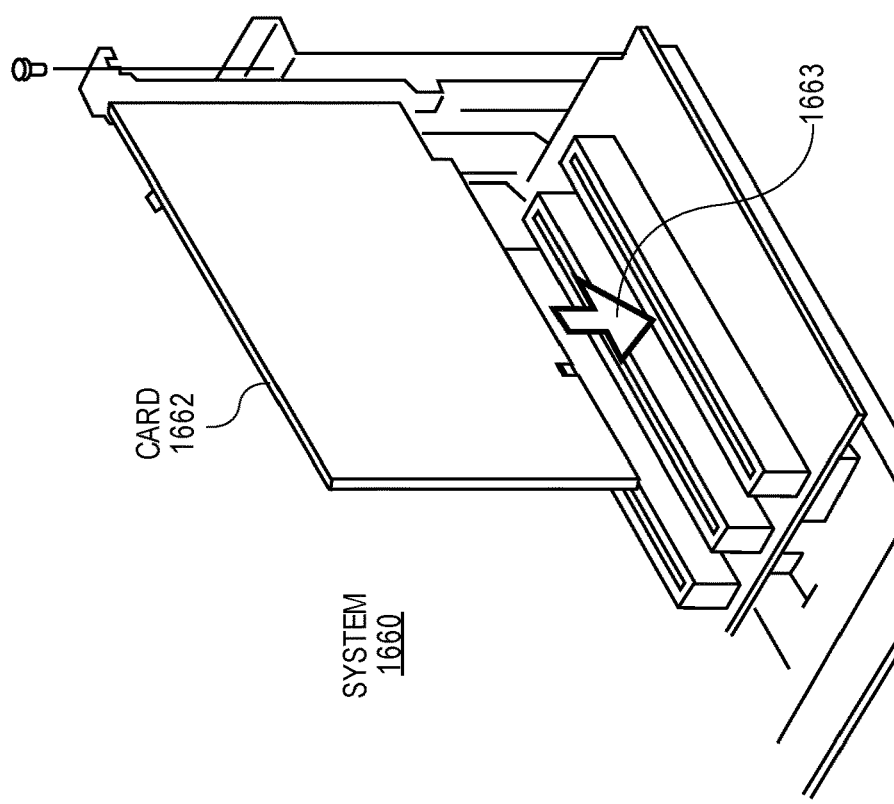
FIG. 8A shows an exemplary embodiment of a hub implemented as a card for deployment in a computer system, appliance, or communication hub in accordance with one embodiment.

FIG. 8A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 8B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network including a wireless arbitrary device as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 8C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 8D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network including a wireless arbitrary device as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuitry 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, a memory for storing instructions includes one or more processing units to execute instructions for controlling a plurality of sensor nodes in a wireless network architecture and determining locations of the plurality of sensor nodes and a wireless arbitrary device and radio frequency (RF) circuitry to transmit communications to and receive communications from the plurality of sensor nodes each having a wireless device with a transmitter and a receiver to enable bi-directional communications with the RF circuitry of the apparatus in the wireless network architecture.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 9:
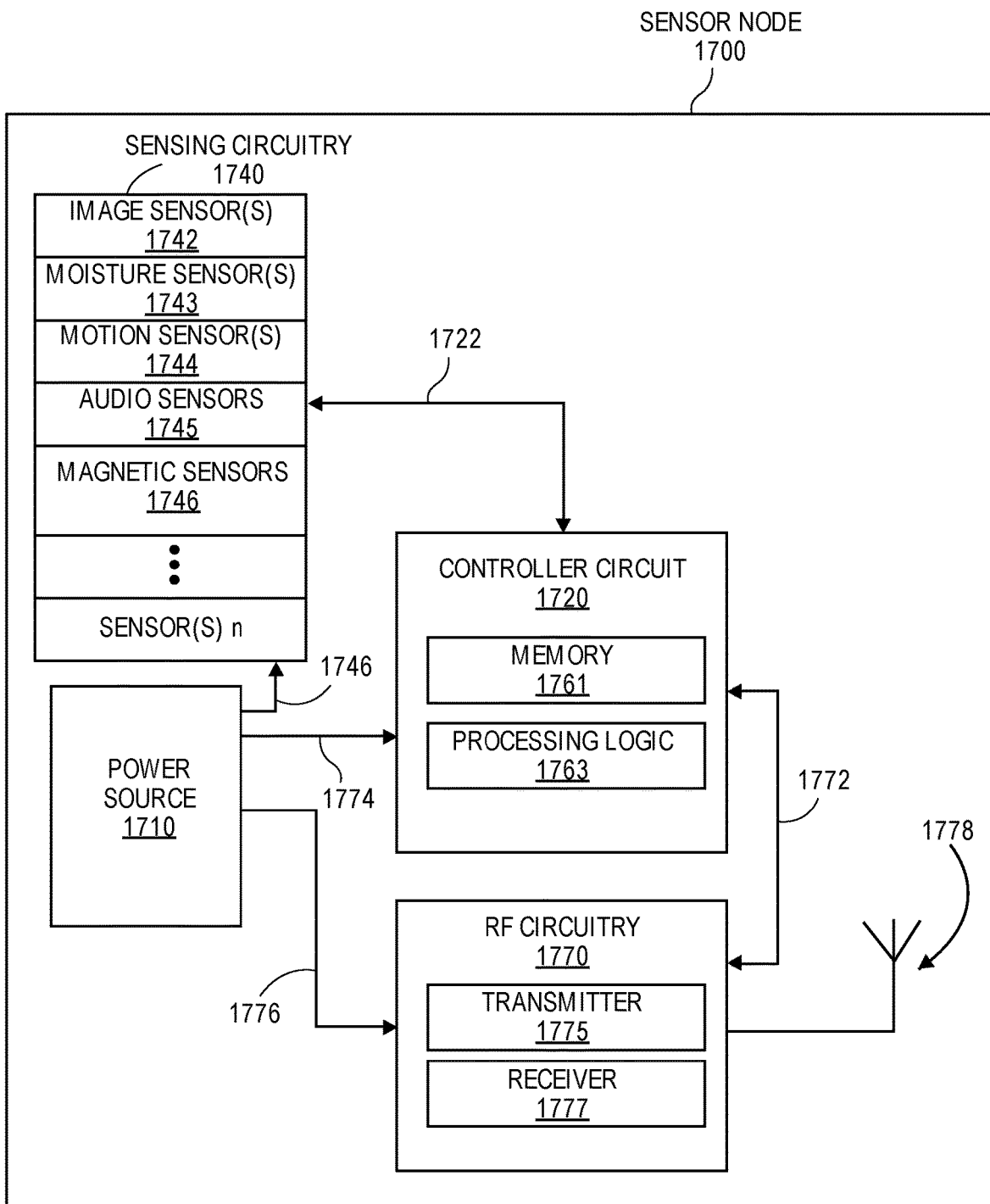
FIG. 9 illustrates a block diagram of a sensor node in accordance with one embodiment.

FIG. 9 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 10:
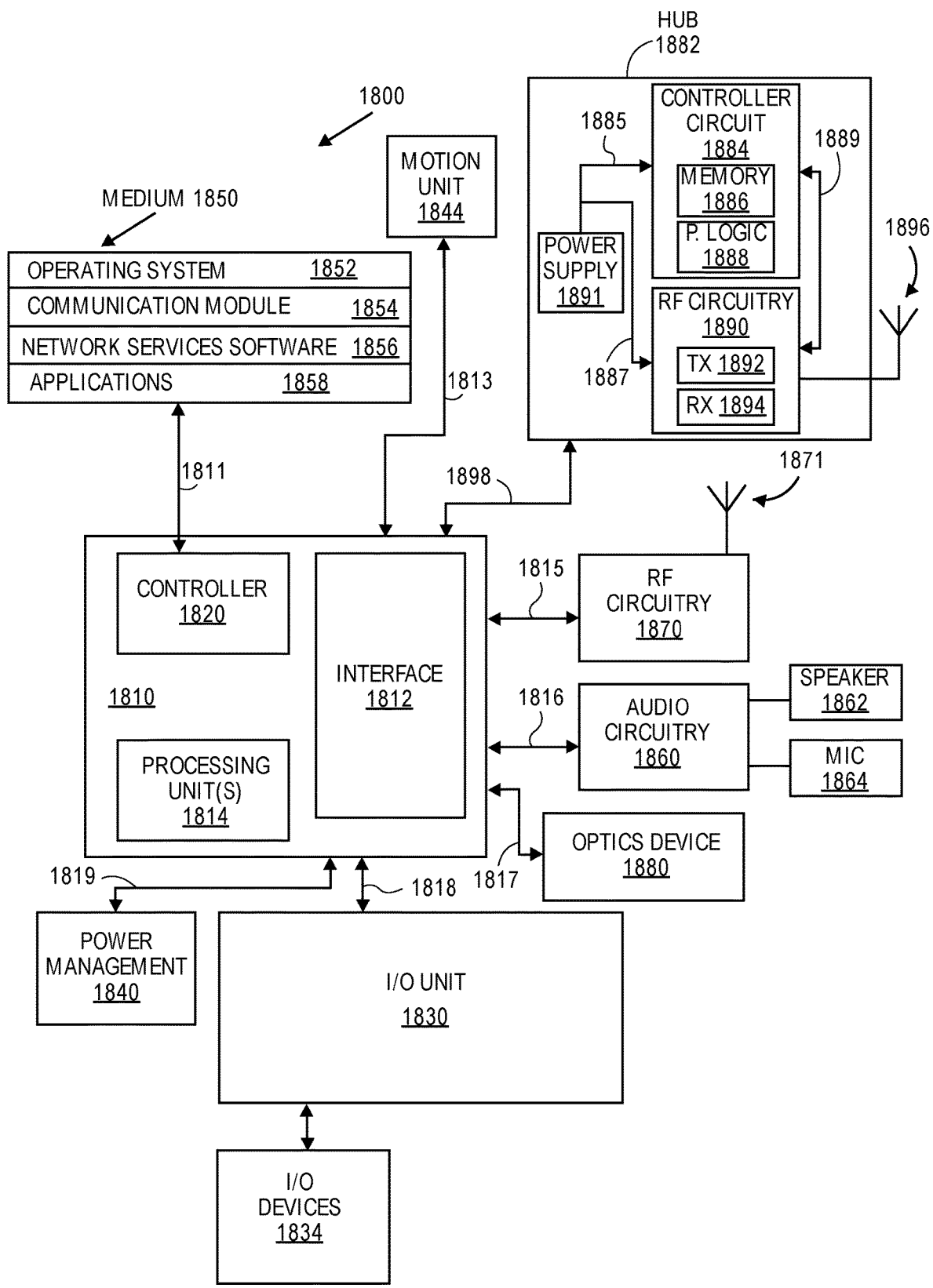
FIG. 10 illustrates a block diagram of a system or appliance 1800 having a hub in accordance with one embodiment.

FIG. 10 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, industrial applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

Any of the following examples can be combined into a single embodiment or these examples can be separate embodiments. In one example, an asynchronous system for localization of nodes in a wireless network architecture comprises a plurality of wireless anchor nodes each having a wireless device with one or more processing units and RF circuitry for transmitting and receiving communications in the wireless network architecture, wherein the one or more processing units of at least one wireless anchor node are configured to receive instructions from a cloud network entity to prepare for localization of the wireless arbitrary device, to change a RF channel to be the same as an RF channel of the wireless arbitrary device based on the received instructions, to receive a communication including data traffic from the wireless arbitrary device, and to obtain ranging information including a receive timestamp and channel sense information (CSI) from the data traffic.

In another example, the one or more processing units of at least one wireless anchor node are further configured to send the ranging information to the cloud network entity for determining localization of the wireless arbitrary device by utilizing a time difference of arrival technique and the ranging information.

In another example, the one or more processing units of at least one wireless anchor node are further configured to send the ranging information to the cloud network entity while discarding payload of the received data traffic from the wireless arbitrary device.

In another example, the wireless arbitrary device is configured to send ranging information for communications received from the plurality of wireless anchor nodes to the cloud network entity for determining localization of the wireless arbitrary device by utilizing a time difference of arrival technique and the ranging information.

In another example, the time difference of arrival technique utilizes data packets of the data traffic from the wireless arbitrary device instead of acknowledgements packets to improve accuracy of the localization due to data packets receiving a wider frequency bandwidth in comparison to acknowledgement packets.

In another example, at least one anchor node has a first reference clock signal and the wireless arbitrary device has a second reference clock signal.

In another example, one of the plurality of wireless anchor nodes is assigned to be a master node for the wireless network architecture.

In another example, the wireless arbitrary device is associated with an access point that is separate from the master node.

In another example, a localization application is installed on the wireless arbitrary device for localization of the wireless arbitrary device without changing a wireless network protocol stack of the wireless arbitrary device.

In one example, an apparatus comprises a memory for storing instructions, one or more processing units to execute instructions for controlling a plurality of sensor nodes in a wireless network architecture and to determine locations of the plurality of sensor nodes and a wireless arbitrary device. A radio frequency (RF) circuitry to transmit communications to and receive communications from the plurality of sensor nodes each having a wireless device with a transmitter and a receiver to enable bi-directional communications with the RF circuitry of the apparatus in the wireless network architecture. The one or more processing units of the apparatus are configured to execute instructions to prepare for localization of the wireless arbitrary device, to change a RF channel to be the same as an RF channel of the wireless arbitrary device, to receive a communication including data traffic from the wireless arbitrary device, and to obtain ranging information including a receive timestamp and channel sense information (CSI) from the data traffic.

In another example, the one or more processing units of the apparatus are further configured to determine localization of the wireless arbitrary device by utilizing a time difference of arrival technique and the ranging information.

In another example, the one or more processing units of the apparatus are further configured to send the ranging information to a cloud network entity for determining localization of the wireless arbitrary device by utilizing a time difference of arrival technique and the ranging information.

In another example, the one or more processing units of the apparatus are further configured to send the ranging information to the cloud network entity while discarding payload of the received data traffic from the wireless arbitrary device.

In another example, the wireless arbitrary device is configured to send ranging information for communications received from the apparatus to the cloud network entity for determining localization of the wireless arbitrary device by utilizing a time difference of arrival technique and the ranging information.

In another example, the time difference of arrival technique utilizes data packets of the data traffic from the wireless arbitrary device instead of acknowledgements packets to improve accuracy of the localization due to data packets receiving a wider frequency bandwidth in comparison to acknowledgement packets.

In another example, the apparatus has a first reference clock signal and the wireless arbitrary device has a second reference clock signal.

In another example, the apparatus is assigned to be a master node for the wireless network architecture. The wireless arbitrary device is associated with an access point that is separate from the master node.

In one example, a computer implemented method for localization of a wireless arbitrary device in a wireless network architecture, comprises initializing a wireless network architecture having a plurality of wireless anchor nodes and a plurality of wireless sensor nodes, preparing, with the plurality of wireless anchor nodes, for localization of the wireless arbitrary device, changing a RF channel of the plurality of wireless anchor nodes to be the same as a RF channel of the wireless arbitrary device; receiving, with the plurality of wireless anchor nodes, a communication including data traffic from the wireless arbitrary device, and obtaining, with the plurality of wireless anchor nodes, ranging information including a receive timestamp and channel sense information (CSI) from the received data traffic.

In another example, the computer implemented method further comprises determining, with a wireless anchor node, localization of the wireless arbitrary device by utilizing a time difference of arrival technique and the ranging information.

In another example, the computer implemented method, further comprises sending, with a wireless anchor node, the ranging information to a cloud network entity for determining localization of the wireless arbitrary device by utilizing a time difference of arrival technique and the ranging information.

In another example, the wireless anchor node sends the ranging information to the cloud network entity while discarding payload of the received data traffic from the wireless arbitrary device.

In another example, the wireless arbitrary device is configured to send ranging information for communications received from the apparatus to the cloud network entity for determining localization of the wireless arbitrary device by utilizing a time difference of arrival technique and the ranging information.

In another example, computer implemented method further comprises assigning an anchor node to be a master node, determining, with a cloud network entity or a wireless anchor node, whether the master node is integrated with an access point that is associated with the wireless arbitrary device.

In another example, the master node sends at least one communication to act as a transmission during a same time period as a transmission of the arbitrary device when the master node is integrated with the access point.

In another example, the computer implemented method further comprises initializing or triggering a localization request for the wireless arbitrary device on demand from a cloud user of the cloud network entity or on demand from a user of the wireless arbitrary device.

In another example, the computer implemented method further comprises initializing or triggering a localization request for the wireless arbitrary device due to a timer-based localization request from the cloud network entity, a timer-based localization request from the wireless arbitrary device, or on a motion basis as determined by a motion device of the arbitrary wireless device.

In one example, a computer implemented method for localization of a wireless arbitrary device in a wireless network architecture, comprises initializing a wireless network architecture having a plurality of wireless anchor nodes and a plurality of wireless sensor nodes, preparing, with the plurality of wireless anchor nodes, for localization of the wireless arbitrary device, waiting, with at least one anchor node, to receive a packet from the wireless arbitrary device, receiving, with the at least one anchor node, a communication including a packet from the wireless arbitrary device, and transmitting, with the at least one anchor node, a communication including a synchronization packet to other anchor nodes of the plurality of wireless anchor nodes.

In another example, the computer implemented method further comprises obtaining, with the at least one wireless anchor node, ranging information including a receive timestamp and channel sense information (CSI) from the received communication including the packet from the wireless arbitrary device.

In another example, for a reactive method the at least one anchor node includes a master node to transmit soon after receiving any packet that the wireless arbitrary device has transmitted when the master node is not integrated with an access point that is associated with the wireless arbitrary device.

In another example, a hybrid method the at least one anchor node includes a master node to wait for initial transmissions from the wireless arbitrary device before initiating transmissions at an interval when the master node is not integrated with an access point.

In another example, for the hybrid method the at least one anchor node includes a master node to wait one interframe interval and this wait is terminated early upon receiving a packet from the wireless arbitrary device.

In one example, a computer implemented method for localization of a wireless arbitrary device in a wireless network architecture, comprises initializing a wireless network architecture having a plurality of wireless anchor nodes and a plurality of wireless sensor nodes, preparing, with the plurality of wireless anchor nodes, for localization of the wireless arbitrary device, estimating, at least partially with at least one anchor node, a predetermined time for when a transmission of the wireless arbitrary device will occur, and waiting, with the at least one anchor node, until this predetermined time for when the transmission occurs.

In another example, the computer implemented method further comprises transmitting, with the at least one anchor node, a communication including a synchronization packet to other anchor nodes based upon estimating this predetermined time.

In another example, the computer implemented method further comprises waiting, with the at least one anchor node, one interframe interval, receiving, with the at least one anchor node, an additional transmission including a packet from the wireless arbitrary device, and transmitting, with the at least one anchor node, an additional communication including a synchronization packet to other anchor nodes.

In another example, for a predictive method the at least one anchor node includes a master node to begin transmitting at an interval with the aim of transmitting just prior to a transmission of the wireless arbitrary device when the master node is not integrated with an access point.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An asynchronous system for localization of a wireless arbitrary device in a wireless network architecture, comprising:
a plurality of wireless anchor nodes each having a wireless device with one or more processing units and RF circuitry for transmitting and receiving communications in the wireless network architecture, wherein the one or more processing units of at least one wireless anchor node are configured to receive instructions from a cloud network entity to prepare for localization of the wireless arbitrary device, to change a RF channel to be the same as an RF channel of the wireless arbitrary device based on the received instructions, to receive a communication including data traffic from the wireless arbitrary device, to obtain ranging information including a receive timestamp and channel sense information (CSI) from the data traffic, and to send the ranging information to the cloud network entity while discarding payload of the received data traffic from the wireless arbitrary device.

2. The asynchronous system of claim 1, wherein the one or more processing units of at least one wireless anchor node are further configured to send the ranging information to the cloud network entity for determining localization of the wireless arbitrary device by utilizing a time difference of arrival technique and the ranging information.

3. The asynchronous system of claim 2, wherein the wireless arbitrary device is configured to send ranging information for communications received from the plurality of wireless anchor nodes to the cloud network entity for determining localization of the wireless arbitrary device by utilizing a time difference of arrival technique and the ranging information.

4. The asynchronous system of claim 2, wherein the time difference of arrival technique utilizes data packets of the data traffic from the wireless arbitrary device instead of acknowledgements packets to improve accuracy of the localization due to data packets receiving a wider frequency bandwidth in comparison to acknowledgement packets.

5. The asynchronous system of claim 4, wherein a localization application is installed on the wireless arbitrary device for localization of the wireless arbitrary device without changing a wireless network protocol stack of the wireless arbitrary device.

6. The asynchronous system of claim 1, wherein the one or more processing units of at least one wireless anchor node are further configured to send the ranging information to the cloud network entity while discarding payload of the received data traffic from the wireless arbitrary device when frames of the wireless arbitrary device are not to be decrypted or decoded.

7. The asynchronous system of claim 1, wherein at least one anchor node has a first reference clock signal and the wireless arbitrary device has a second reference clock signal.

8. The asynchronous system of claim 1, wherein one of the plurality of wireless anchor nodes is assigned to be a master node for the wireless network architecture.

9. The asynchronous system of claim 8, wherein the wireless arbitrary device is associated with an access point that is separate from the master node.

10. An apparatus, comprising:
a memory for storing instructions;
one or more processing units to execute instructions for controlling a plurality of sensor nodes in a wireless network architecture and determining locations of the plurality of sensor nodes and a wireless arbitrary device; and
radio frequency (RF) circuitry to transmit communications to and receive communications from the plurality of sensor nodes each having a wireless device with a transmitter and a receiver to enable bi-directional communications with the RF circuitry of the apparatus in the wireless network architecture, wherein the one or more processing units of the apparatus are configured to execute instructions to prepare for localization of the wireless arbitrary device, to change a RF channel to be the same as an RF channel of the wireless arbitrary device, to receive a communication including data traffic from the wireless arbitrary device, and to obtain ranging information including a receive timestamp and channel sense information (CSI) from the data traffic, and to send the ranging information to a cloud network entity while discarding payload of the received data traffic from the wireless arbitrary device.

11. The apparatus of claim 10, wherein the one or more processing units of the apparatus are further configured to determine localization of the wireless arbitrary device by utilizing a time difference of arrival technique and the ranging information.

12. The apparatus of claim 11, wherein the time difference of arrival technique utilizes data packets of the data traffic from the wireless arbitrary device instead of acknowledgements packets to improve accuracy of the localization due to data packets receiving a wider frequency bandwidth in comparison to acknowledgement packets.

13. The apparatus of claim 10, wherein the one or more processing units of the apparatus are further configured to send the ranging information to a cloud network entity for determining localization of the wireless arbitrary device by utilizing a time difference of arrival technique and the ranging information.

14. The apparatus of claim 13, wherein the one or more processing units of the apparatus are further configured to send the ranging information to the cloud network entity while discarding payload of the received data traffic from the wireless arbitrary device when frames of the wireless arbitrary device are not to be decrypted or decoded.

15. The apparatus of claim 10, wherein the wireless arbitrary device is configured to send ranging information for communications received from the apparatus to the cloud network entity for determining localization of the wireless arbitrary device by utilizing a time difference of arrival technique and the ranging information.

16. The apparatus of claim 10, wherein the apparatus has a first reference clock signal and the wireless arbitrary device has a second reference clock signal.

17. The apparatus of claim 10, wherein the apparatus is assigned to be a master node for the wireless network architecture, wherein the wireless arbitrary device is associated with an access point that is separate from the master node.

18. A computer implemented method for localization of a wireless arbitrary device in a wireless network architecture, comprising:

initializing a wireless network architecture having a plurality of wireless anchor nodes and a plurality of wireless sensor nodes;

preparing, with the plurality of wireless anchor nodes, for localization of the wireless arbitrary device;

changing a RF channel of the plurality of wireless anchor nodes to be the same as a RF channel of the wireless arbitrary device;

receiving, with the plurality of wireless anchor nodes, a communication including data traffic from the wireless arbitrary device;

obtaining, with the plurality of wireless anchor nodes, ranging information including a receive timestamp and channel sense information (CSI) from the received data traffic; and sending the ranging information to a cloud network entity while discarding payload of the received data traffic from the wireless arbitrary device.

19. The computer implemented method of claim 18, further comprising:

determining, with a wireless anchor node, localization of the wireless arbitrary device by utilizing a time difference of arrival technique and the ranging information.

20. The computer implemented method of claim 18, further comprising:

sending, with a wireless anchor node, the ranging information to a cloud network entity for determining localization of the wireless arbitrary device by utilizing a time difference of arrival technique and the ranging information.

21. The computer implemented method of claim 20, wherein the wireless anchor node sends the ranging information to the cloud network entity while discarding payload of the received data traffic from the wireless arbitrary device when frames of the wireless arbitrary device are not to be decrypted or decoded.

22. The computer implemented method of claim 18, wherein the wireless arbitrary device is configured to send ranging information for communications received from the apparatus to the cloud network entity for determining localization of the wireless arbitrary device by utilizing a time difference of arrival technique and the ranging information.

23. The computer implemented method of claim 18, further comprising:

assigning an anchor node to be a master node;

determining, with a cloud network entity or a wireless anchor node, whether the master node is integrated with an access point that is associated with the wireless arbitrary device.

24. The computer implemented method of claim 23, wherein the master node sends at least one communication to act as a transmission during a same time period as a transmission of the arbitrary device when the master node is integrated with the access point.

25. The computer implemented method of claim 18, further comprising:

initializing or triggering a localization request for the wireless arbitrary device on demand from a cloud user of the cloud network entity or on demand from a user of the wireless arbitrary device.

26. The computer implemented method of claim 18, further comprising:

initializing or triggering a localization request for the wireless arbitrary device due to a timer-based localization request from the cloud network entity, a timer-based localization request from the wireless arbitrary device, or on a motion basis as determined by a motion device of the arbitrary wireless device.

\* \* \* \* \*